(12) United States Patent
Goetsch et al.

(10) Patent No.: US 11,752,814 B1
(45) Date of Patent: Sep. 12, 2023

(54) LIFT DEVICES FOR CONTAINERS

(71) Applicant: Daniel B. Goetsch, Lucerne Valley, CA (US)

(72) Inventors: Daniel B Goetsch, Upland, CA (US); Clint Griffith, Lucerne Valley, CA (US)

(73) Assignee: Daniel B. Goetsch, Victorville, CA (US)

( * ) Notice: Subject to any disclaimer, the term of this patent is extended or adjusted under 35 U.S.C. 154(b) by 0 days.

(21) Appl. No.: 18/129,818

(22) Filed: Mar. 31, 2023

Related U.S. Application Data

(60) Provisional application No. 63/450,539, filed on Mar. 7, 2023, provisional application No. 63/421,648, filed on Nov. 2, 2022, provisional application No. 63/357,896, filed on Jul. 1, 2022, provisional application No. 63/354,826, filed on Jun. 23, 2022, provisional application No. 63/335,355, filed on Apr. 27, 2022, provisional application No. 63/327,871, filed on Apr. 6, 2022.

(51) Int. Cl.
| | |
|---|---|
| *B60P 3/40* | (2006.01) |
| *B60D 1/167* | (2006.01) |
| *F16B 21/02* | (2006.01) |
| *B60D 1/44* | (2006.01) |
| *B60D 1/01* | (2006.01) |

(52) U.S. Cl.
CPC .......... *B60D 1/1675* (2013.01); *B60D 1/015* (2013.01); *B60D 1/44* (2013.01); *B60P 3/40* (2013.01); *F16B 21/02* (2013.01)

(58) Field of Classification Search
CPC ........ B60D 1/1675; B60D 1/015; B60D 1/44; B60P 3/40; F16B 21/02
See application file for complete search history.

(56) References Cited

U.S. PATENT DOCUMENTS

| | | | | |
|---|---|---|---|---|
| 3,631,999 | A  * | 1/1972 | Walerowski | B65D 90/146 |
| | | | | 280/43.11 |
| 10,933,795 | B2 * | 3/2021 | Shelagowski | B66F 9/24 |
| 2010/0111633 | A1 * | 5/2010 | Pedersen | F03D 13/40 |
| | | | | 410/44 |
| 2012/0298935 | A1 * | 11/2012 | Ross | B62D 53/04 |
| | | | | 254/2 R |
| 2016/0236610 | A1 * | 8/2016 | Ross | B60P 3/40 |
| 2018/0118542 | A1 * | 5/2018 | Shelagowski | B66F 9/24 |
| 2020/0231080 | A1 * | 7/2020 | Weatherby, III | B60P 1/6481 |

* cited by examiner

*Primary Examiner* — Kevin Hurley
*Assistant Examiner* — Marlon A Arce
(74) *Attorney, Agent, or Firm* — Manuel de la Cerra

(57) ABSTRACT

A transport frame for use with a container with top mounting blocks and bottom mounting blocks, and a vehicle with a tow ball, is disclosed. The frame is V-shaped and connects to the top mounting blocks and to the bottom mounting blocks using novel connections. These connections may be pivotally connected to the frame, reducing the stresses on the frame during transport. The frame may also include a winch that facilitates the connection of the frame to the container. A novel cam lug is also disclosed.

21 Claims, 29 Drawing Sheets

Top Block Connection Assembly

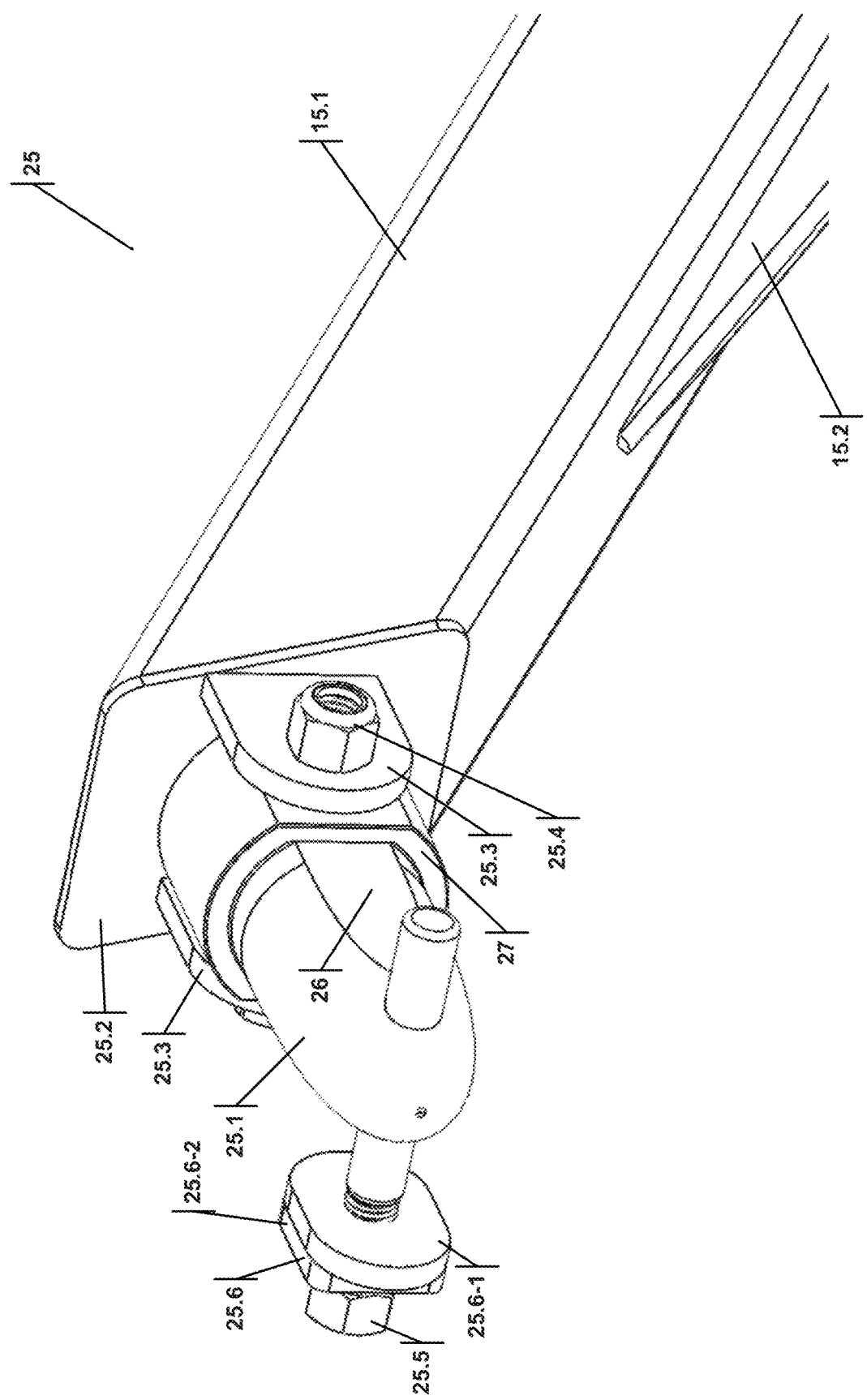

Bottom Block Connection Assembly

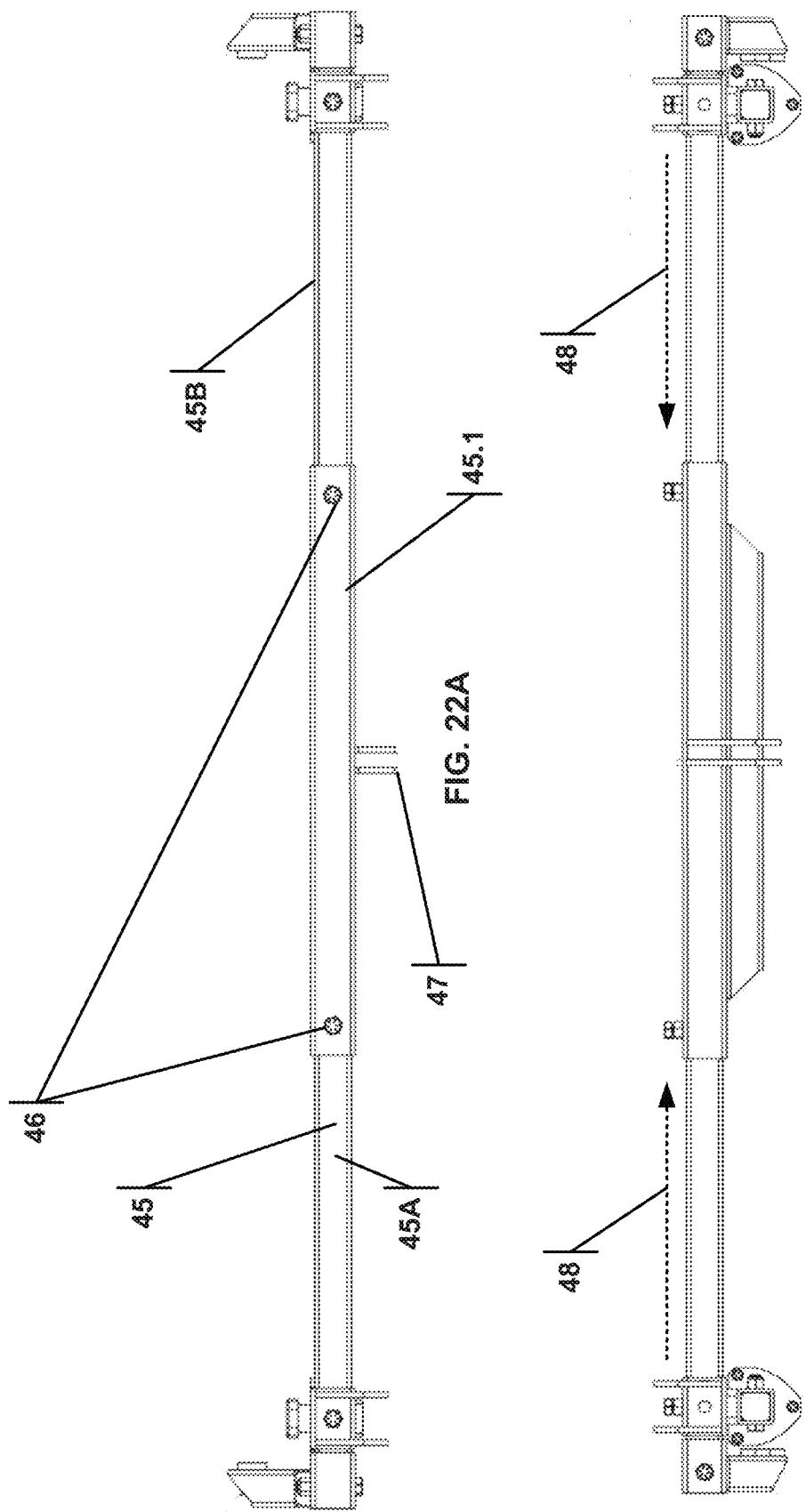

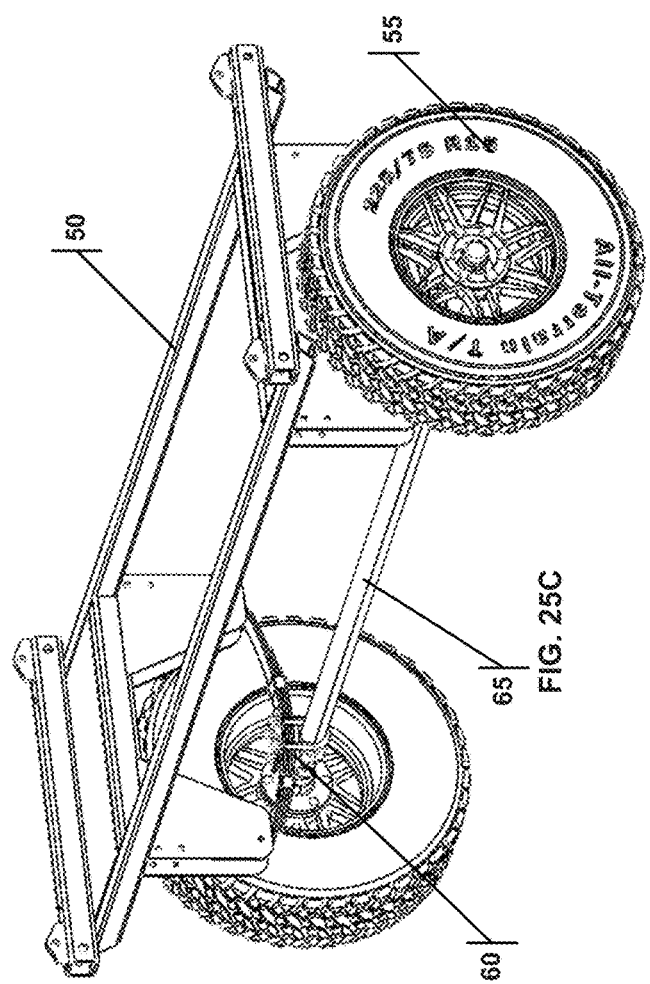
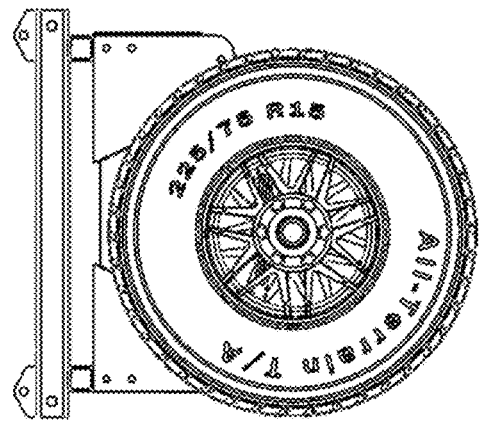
FIG. 25C
FIG. 25D

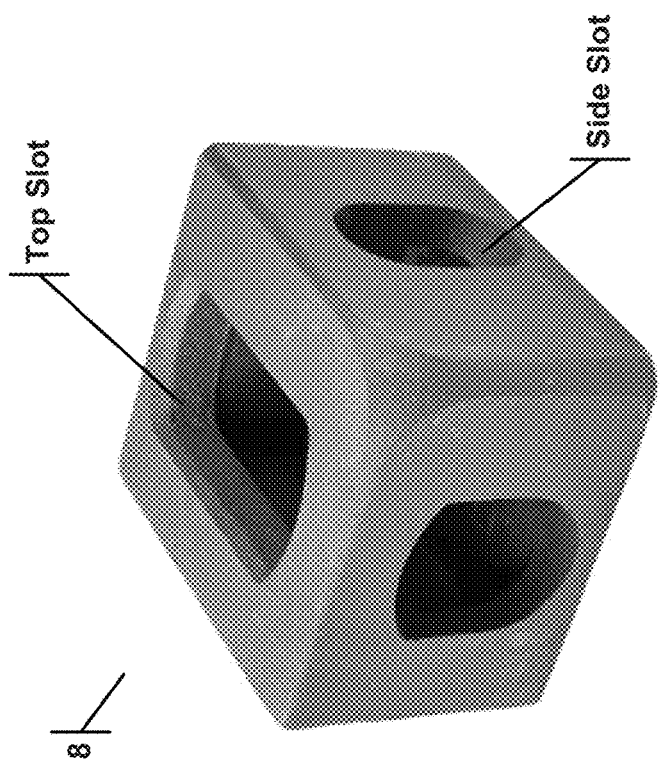
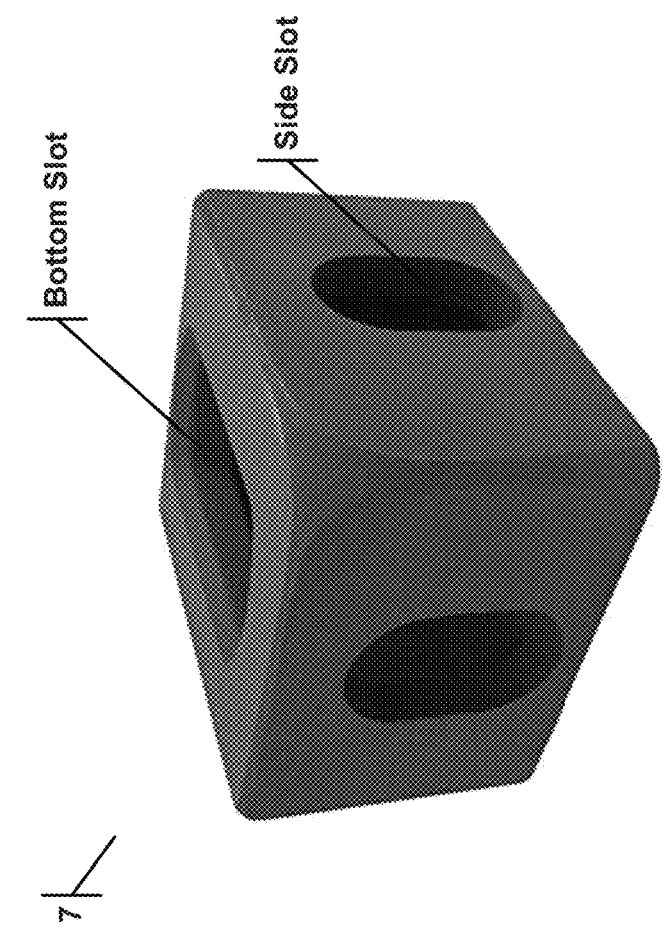
FIG. 26
(Prior Art)

LIFT DEVICES FOR CONTAINERS

1.0 CROSS-REFERENCE TO RELATED APPLICATIONS

This application claims priority to U.S. provisional application 63/327,871, titled Lift Devices for Container, filed on Apr. 6, 2022; to U.S. provisional application 63/335,355, titled Lift Devices for Container, filed on Apr. 27, 2022; to U.S. provisional application 63/354,826, titled Lift Devices for Container, filed on Jun. 23, 2022; to U.S. provisional application 63/357,896, titled Lift Devices for Container, filed on Jul. 1, 2022; to U.S. provisional application 63/421,648, titled Lift Devices for Container, filed on Nov. 22, 2022; and to U.S. provisional application 63/450,539, titled Lift Devices for Container, filed on Mar. 7, 2023. All of these applications are incorporated herein by reference in their entireties.

This application is also related to U.S. application Ser. No. 17/237,883, titled Swing Caster Dolly, filed on Apr. 22, 1921, the entire contents of which are incorporated herein by reference in its entirety.

2.0 FIELD OF THE INVENTION

This invention relates to devices used to lift cargo containers.

3.0 BACKGROUND

Cargo shipping containers generally have four corner top container mounting blocks 8 and four corner bottom container mounting blocks 7, each of which has two slot types, as shown in FIG. 26. A top/bottom slot (1 per block) is a 3"×4" connector called a "Hammer" or a "TwistLock". This is the most common connector, as it enables the stacking of cargo shipping containers on top of one another on boats 10 high. The corner blocks also have side slots (2 per corner), which are 2"×3". These slots are primarily used to access the top/bottom slot, but can also be used to connect to or mount to the corner mounting blocks 7, 8 of the cargo container with a "LUGS" connector that can be used to pick up and move the cargo shipping container.

Current state-of-the-art wheel dollies are simply not robust enough to lift the weight of a cargo container. Moreover, these dollies require their own hydraulic lift mechanism to ultimately raise heavy objects from the floor. For example, U.S. Pat. No. 3,653,527 discloses a wheel dolly with an integrated hydraulic jack used to raise the wheel. Likewise, U.S. Pat. No. 4,050,597 discloses a similar jack system. The problem with these integrated jack systems is that they are heavy because of the additional weight from the dedicated jack system. They are also expensive for the same reason.

Other wheel dollies use a threaded bolt system to create the lift needed to raise the object. For example, U.S. Pat. No. 7,597,524 discloses a parallelogram lift system with a bolt that is turned to raise the wheels. U.S. Pat. No. 7,232,138 teaches a long bolt that, when turned, brings two arms in contact with the object, and, as the bolt is further turned, the arms lift the wheel. These systems, too, have shortcomings. It can be very taxing to turn a bolt sufficiently to raise an object that weights several tons. Also, it can be unsafe to require a user to be so close to the object dolly with manual tools when lifting. Wheel dollies can fail for a variety of reasons, and a user should not be close to the dolly when such a failure occurs.

To meet these deficiencies, the art has turned to massive cranes, hoists, and specialized heavy jacks. These solutions are expensive, heavy, and complicated.

What is therefore needed are devices that overcome these deficiencies and allow for both lifting and easy movement of cargo shipping containers.

4.0 SUMMARY

The present invention provides an elegant solution to the needs described above and offers numerous additional benefits and advantages, as will be apparent to persons of skill in the art. In particular, a transport frame for use with a container with top mounting blocks and bottom mounting blocks, and a vehicle with a tow ball, are disclosed. The frame is V-shaped and connects to the top mounting blocks and to the bottom mounting blocks using novel connections. These connections may be pivotally connected to the frame, reducing the stresses on the frame during transport. The frame may also include a winch that facilitates the connection between the frame and the container. A novel cam lug is also disclosed.

Specifically, the frame may include a gooseneck constructed to pivotally mount to the tow ball (12) and a first and a second top frame bars that are connected to the gooseneck and extend away from the gooseneck (20) in a V shape. Similarly, a first and a second bottom frame bars are connected to the gooseneck and extend away in a V shape. The bottom frame bars are connected to the top frame bars to provide additional rigidity. At the end of each top frame bar is a top block connection assembly, each of which is constructed to attach to the top mounting blocks. Also, two struts are connected to and extend downwardly away from the top frame bars. At the end of each strut is a bottom block connection assembly, each of which is constructed to attach to the bottom mounting blocks. A cross bar connects both the bottom block assemblies. A winch positioned in between the top frame bars includes a cable connected to the cross bar.

The cross bar may include a first section and a second section that slide into a cross-bar bracket, and the cross-bar bracket includes at least two bolts that secure the first section and the second section to the cross-bar bracket. The cross-bar bracket may include an eyelet constructed to attach to the cable.

The frame may also have a cross support connected to the top frame bars, and the winch may be mounted on this cross support. The winch may include an electric motor with a controller.

The connections of the struts to the top frame bars may include a pivot. The gooseneck may be made of two sections, one of which slides into the other, and a bolt that fixes the position of the sections relative to each other.

The top block connection assemblies may include an upper plug pivotally mounted to the end of the top frame bar, wherein the upper plug is constructed to be inserted into the top mounting block. The upper plug may also include a hole to receive a plug mounting bolt. The plug mounting bolt may have a flange with (1) an oblong portion constructed to be inserted into the top mounting block and then rotated to prevent the plug mounting bolt from exiting the top mounting block; and (2) a square portion constructed to prevent the rotation of the flange. The upper plug may be oblong-shaped with at least two flat sides, and may further include an expanded rim.

The bottom block connection assemblies may include a joint connected to the end of the strut and also connected to a cross-bar connector constructed to receive the cross bar.

These assemblies may also have a cam lug constructed to be inserted into the bottom mounting block and secured thereto by rotating the cam lug. The cam lug may be connected to the cross-bar connector.

The bottom mounting blocks of the container may have a first hole with a first face and a second hole with a second face, wherein the first face is orthogonal to the second face. An orthogonal connection bar with a lug may be connected to the cross bar and inserted into the second hole, while the cam lug is inserted into the first hole.

The cam lug may include a post with a post hole, a cam flange connected to the post, and a necked lug with an oblong tip connected to the cam flange. The post hole may receive a bolt to secure the connection of the cross-bar connector to the cam lug.

A transportation system is also disclosed that includes the frame described herein and a container saddle constructed to be attached to the container. The saddle includes an axle and at least two wheels, and may optionally have a suspension system. A method of using this cam lug is also disclosed. The oblong tip and necked lug are inserted into a connection block of a container. The cam lug is then rotated, causing (1) the oblong tip to prevent the connection structure from detaching from the mounting block, and (2) the connection structure to move vertically within the mounting block as the cam flange contacts the ground. Then, the set bolts are tightened securing the cam lug to the mounting block. Now various structures may be connected to the cam lug, and the cam lug may be used to lift the container.

Additional aspects, alternatives and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. Furthermore, various features of different disclosed embodiments can be combined to form additional embodiments, which are part of this disclosure. It will be understood that certain components and details may not appear in the figures to assist in more clearly describing the invention.

FIG. 9B is an isometric view of the top block connection assembly.

FIG. 22A is a top view of the cross bar.

FIG. 22B is a rear view of the cross bar.

FIG. 25C is an isometric view of the container saddle, with an axle and wheel.

FIG. 25D is a side view of the container saddle, with an axle and wheel.

FIG. 26 illustrates a common top/bottom container mounting block used on a cargo container.

6.0 DETAILED DESCRIPTION

Figure 1:
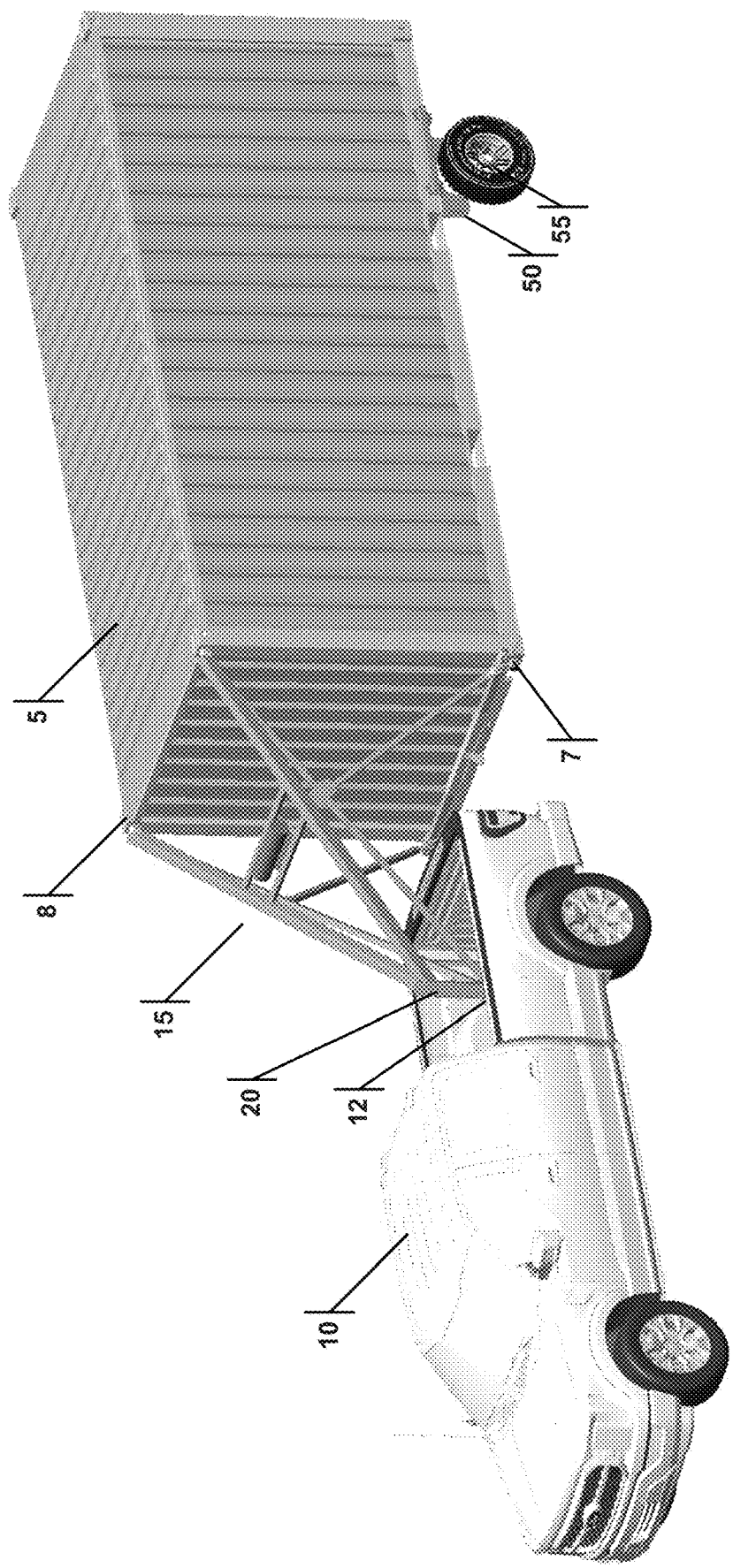
FIG. 1 illustrates a pickup truck connected to a container via a V-Lift frame.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms, unless noted otherwise. Similarly, various steps of the methods shown and described herein are not necessarily performed in the order indicated, or performed at all, in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection, unless otherwise noted.

The following list of example features corresponds with the attached figures and is provided for ease of reference, where like reference numerals designate corresponding features throughout the specification and figures:

5 Container
7 Bottom Container Mounting Block
7.1 Bottom Mounting Block Hole
7.2 Bottom Mounting Block Hole
8 Top Container Mounting Block
8.1 Top Mounting Block Hole
8.2 Top Mounting Block Hole
8.3 Top Mounting Block Hole
10 Pickup Truck
12 Pickup Truck Bed Ball Joint
15 V-Lift Frame
15.1 Top V-Lift Frame Bars
15.2 Bottom V-Lift Frame Bars
15.3 Struts
15.4 Strut Pivot Mounting Plates
15.5 Strut Pivot Pin
15.6 Winch
15.7 Winch Plate
15.8 Winch Plate Cross Supports
15.9 Winch Cable
16 Controller
20 Gooseneck
20.1 Gooseneck Section
20.2 Gooseneck Section
20.3 Bolt
25 Top Block Connection Assembly
25.1 Upper Plug
25.2 Frame End Plate
25.3 Plug Pivot Plate
25.4 Plug Pivot Bolt
25.5 Plug Mounting Bolt
25.6 Plug Mounting Bolt Flange
25.6-1 Oblong Portion of the Flange
25.6-2 Square Portion of the Flange
25.7 Pivot Bolt Receiver Hole
25.8 Mounting Bolt Receiver Hole
25.9 Rotation of Plug Mounting Bolt Flange
26 Plug Flat Sides
27 Expanded Rim
28 Bearings
30 Bottom Block Connection Assembly
31 Cam Lug
31.1 Connection Post
31.2 Post Hole
31.3 Cam Flange
31.4 Set Bolt Threading
31.5 Necked Lug
31.6 Oblong Tip
31.7 Cam Lug Rotation
32 Orthogonal Connection Bar
33 Heim Joint
34 Heim Support Bolt
35 Heim Supports
36 Cross-Bar Connector
37 Set Bolt
38 Lug
39 Bolt
40 Bolt
41 Bolt
45 Cross Bar
45A Cross-Bar Section
45B Cross-Bar Section
45.1 Cross-Bar Eyelet Bracket
46 Bolt
47 Position to Attach Winch Cable
48 Direction of Cross Bar Slide
50 Container Saddle
55 Container Saddle Wheel
60 Leaf Spring
65 Axle FIG. 1 illustrates a V-Lift frame 15 connecting a pickup truck 10 to a top mounting block 8 and a bottom mounting block 7 of a container 5. The pickup 10 has a ball joint that is attached to the gooseneck 20 of the V-Lift Frame 15. The container 5 sits within a container saddle 50 with wheels 55.

Figure 2:
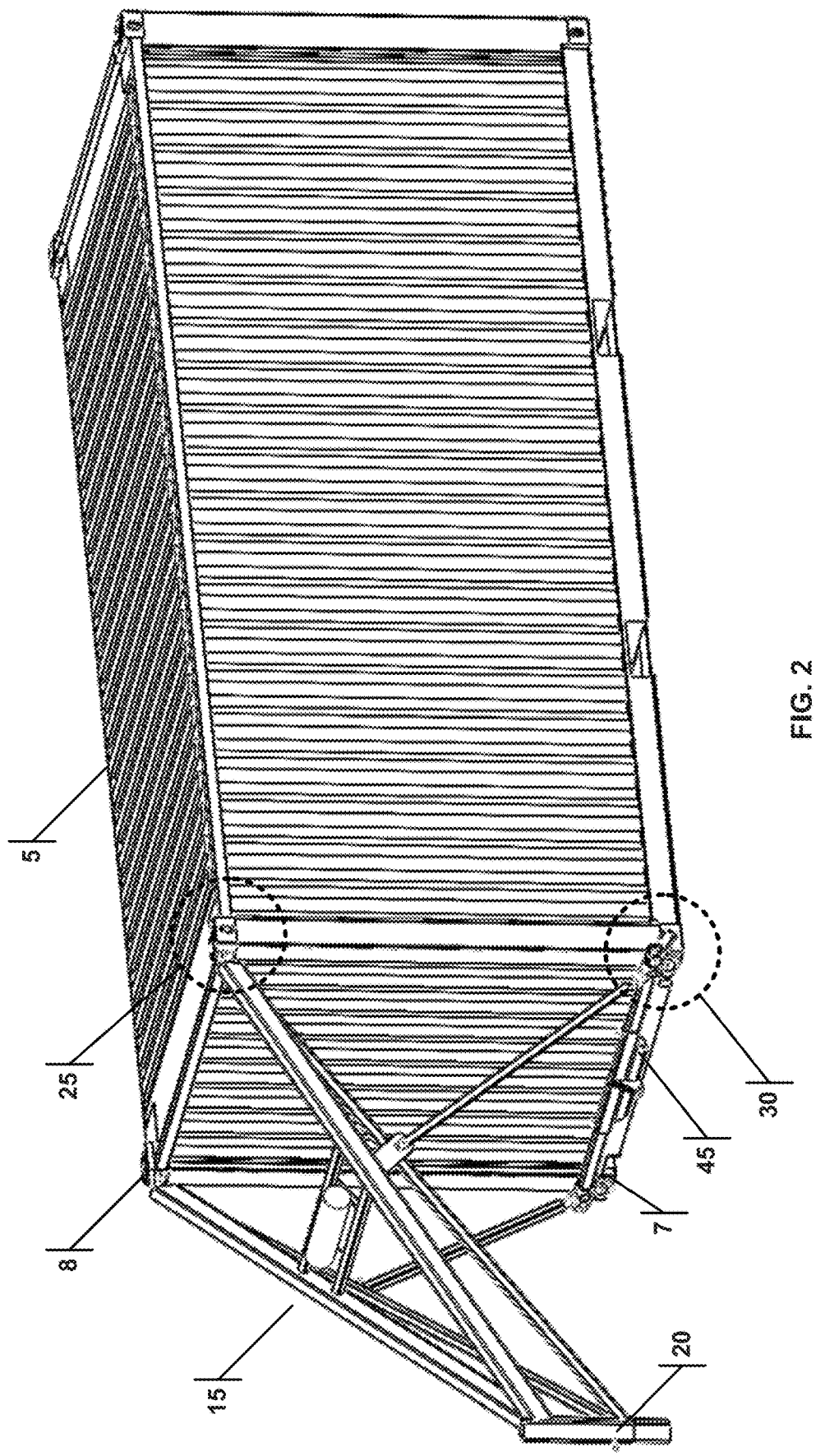
FIG. 2 illustrates a container connected to a V-Lift frame.
Figure 3:
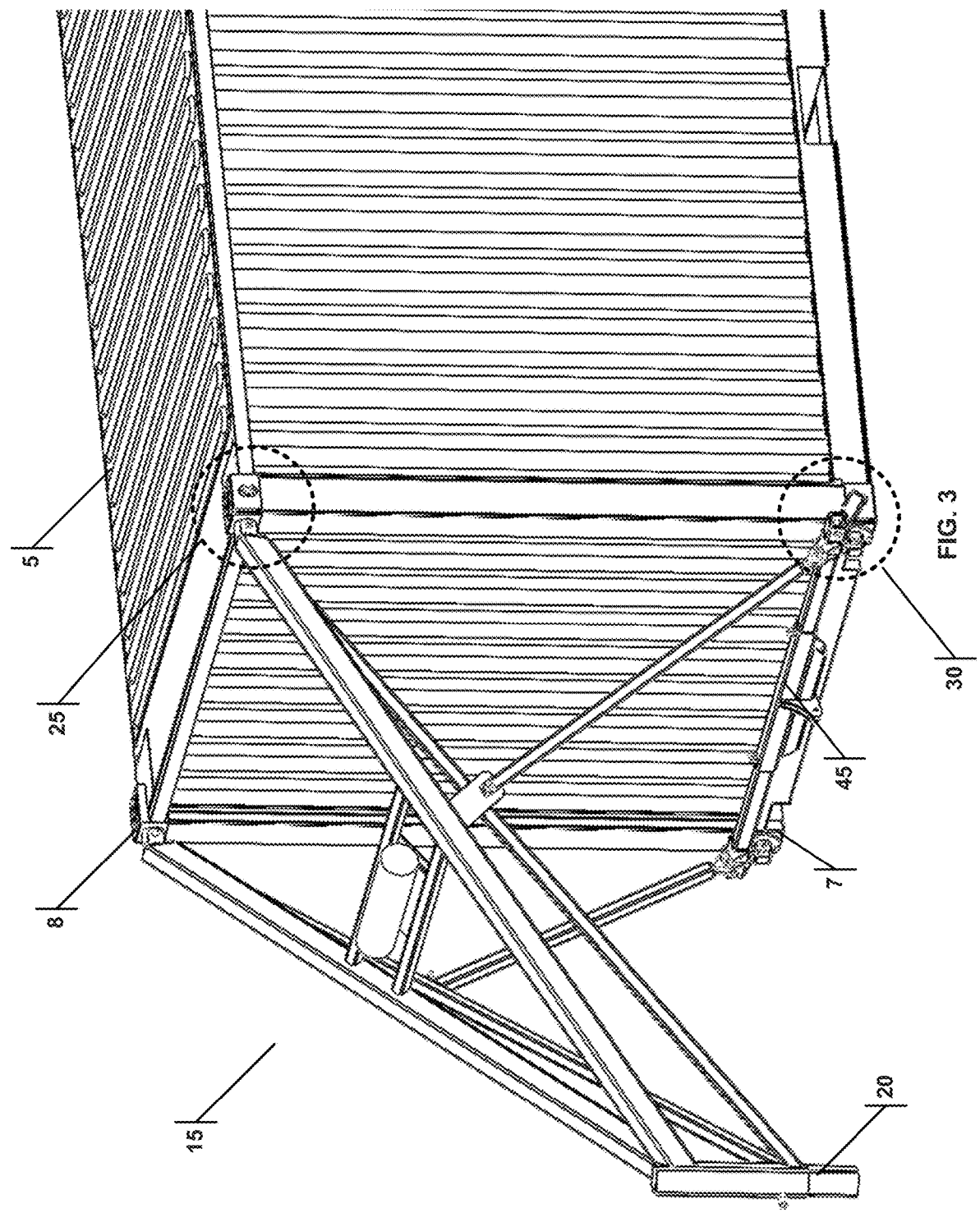
FIG. 3 is an enlarged view of the V-Lift frame connected to the container.
Figure 4:
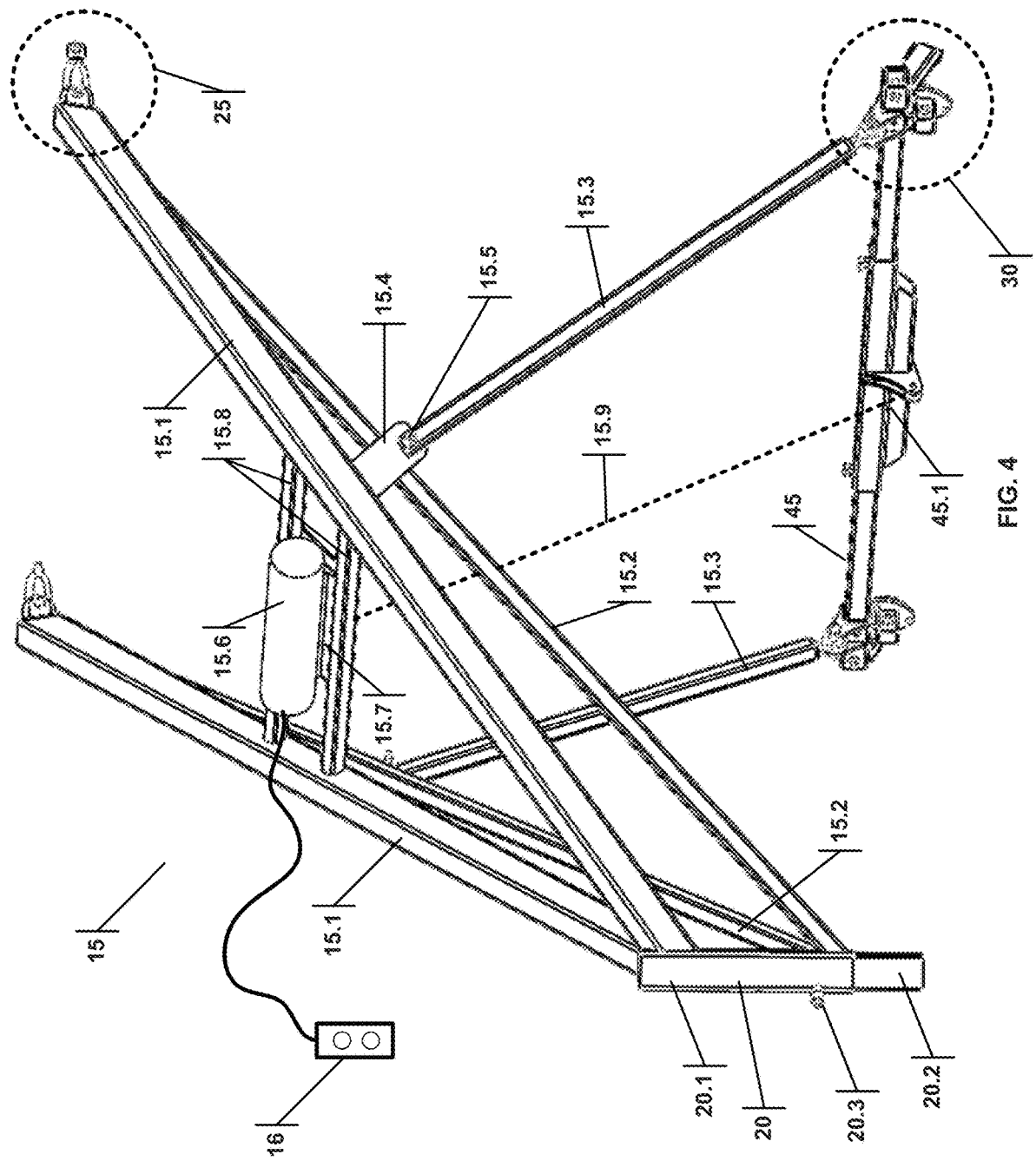
FIG. 4 is an isometric view of the V-Lift frame.
Figure 5:
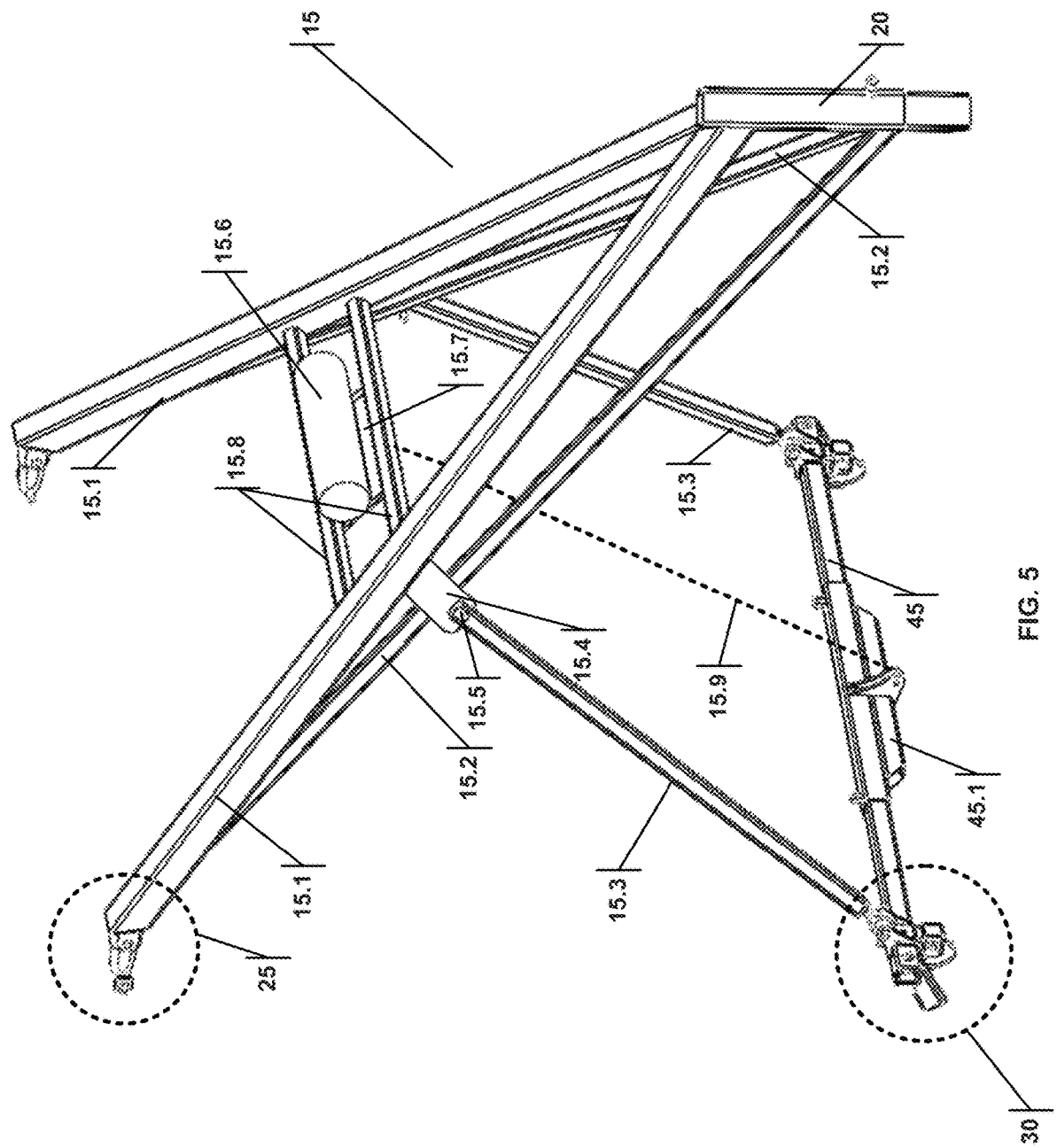
FIG. 5 is an isometric view of the V-Lift frame.
Figure 6:
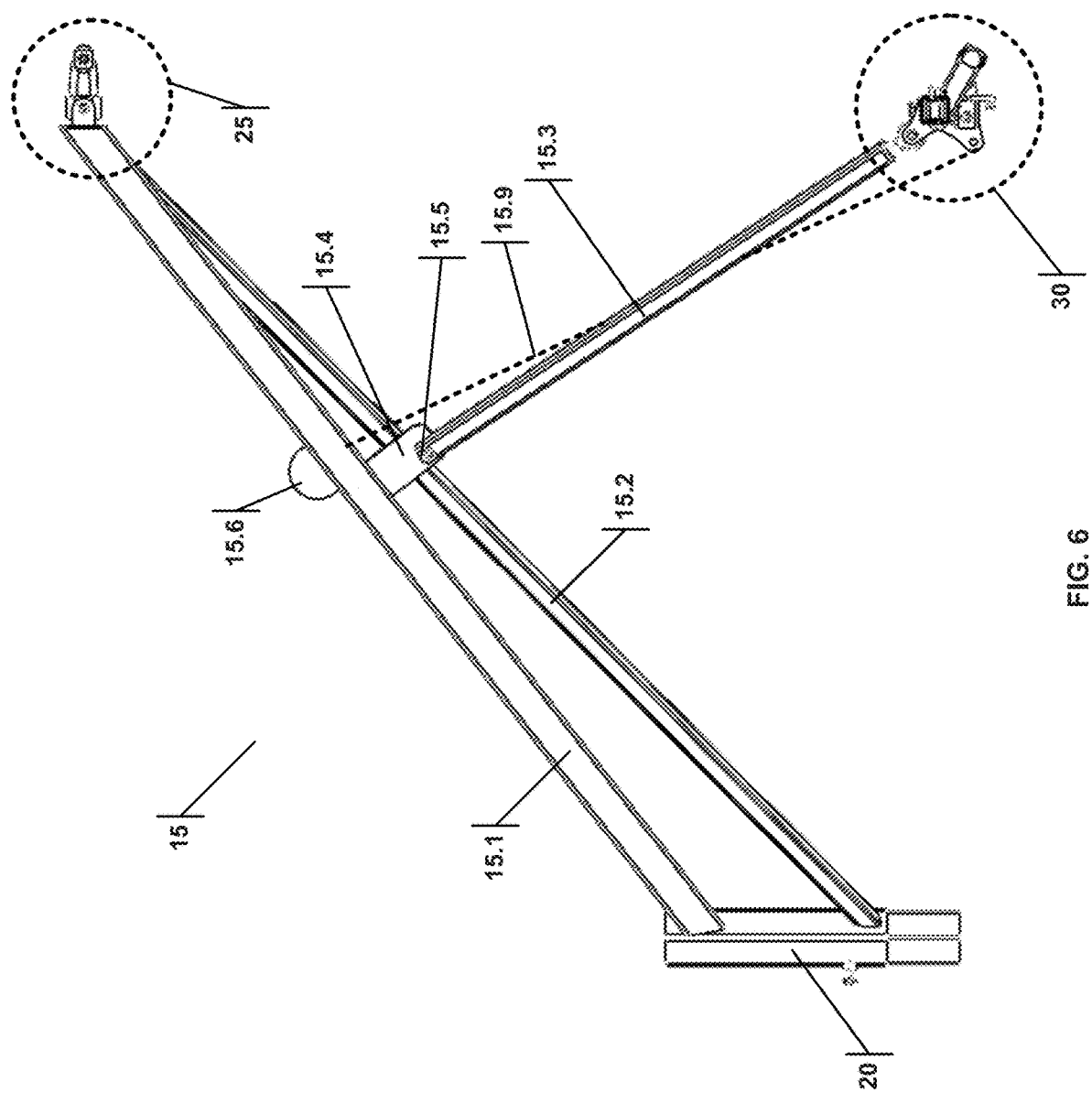
FIG. 6 is a side view of the V-Lift frame.
Figure 7:
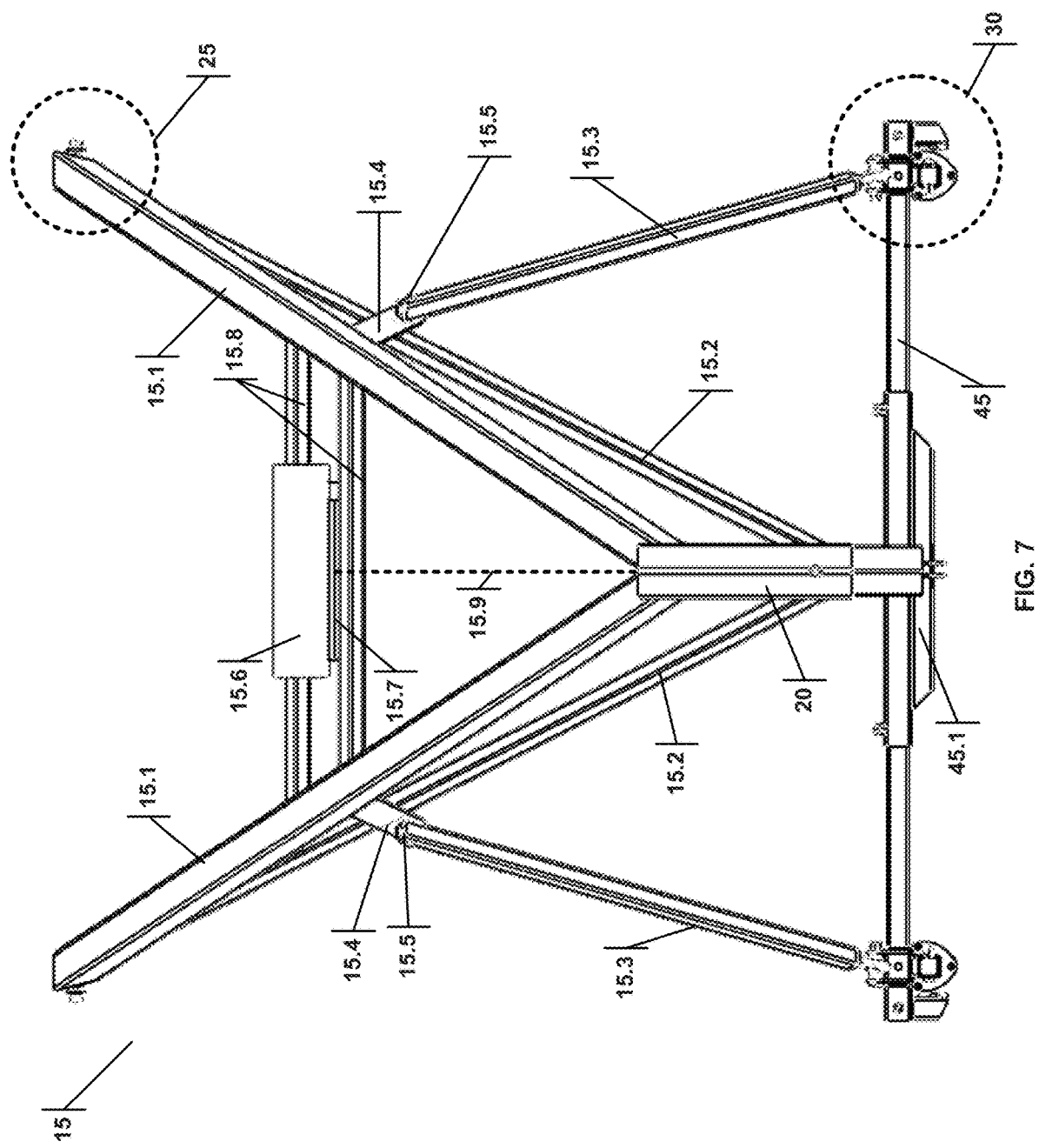
FIG. 7 is front view of the V-Lift frame.
Figure 8:
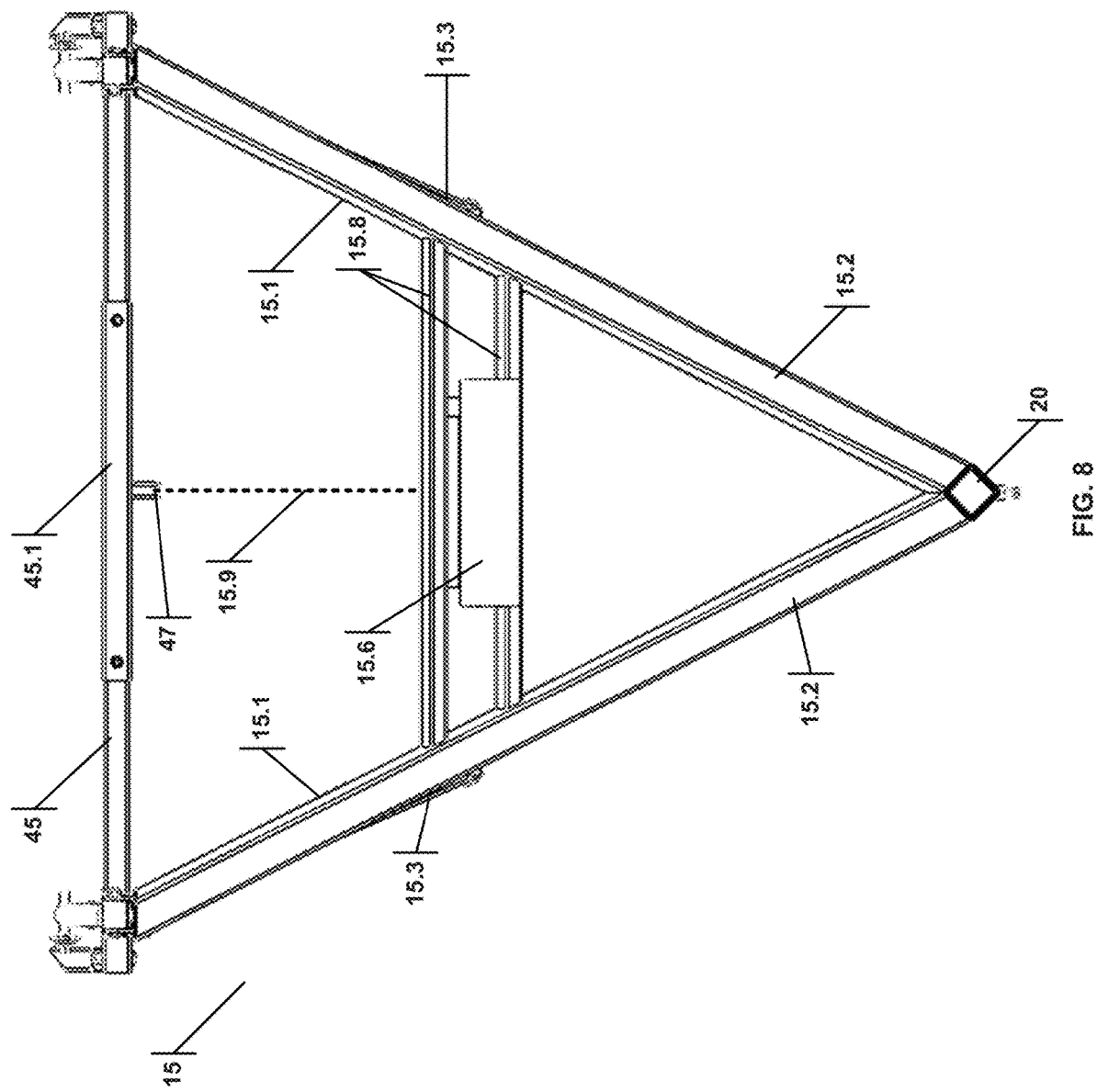
FIG. 8 is top view of the V-Lift frame.

FIGS. 2 and 3 illustrate in more detail the connection of the V-Lift frame 15 with the container mounting blocks 7,8 through the top block connection assembly 25 and the bottom block connection assembly 30.

FIGS. 4 through 8 illustrate the V-Lift frame 10 in greater detail. Specifically, the gooseneck 20 connects to the top V-Lift frame bars 15.1 that extend away from the gooseneck and have the top block connection assembly 25 at the distal end of each V-Lift frame bar 15.1. Also connected to and extending from the gooseneck 15 are the bottom V-Lift frame bars 15.2 that connect to the top V-Lift bars 15.1 near the distal end. Cross supports 15.8 extend between and connect to the top V-Lift frame bars 15.1, forming a strong and rigid A-frame. Strut mounting plates 15.4 may be connected to the top V-Lift Frame bars 15.1, and extending from those plates are struts 15.3. A bottom block connection assembly 30 is connected to the end of each strut 15.3. A cross bar 45 extends between the bottom block connection assemblies 30, providing more rigidity to the V-Lift frame 15. A winch plate 15.7 may be connected to the cross supports 15.8, and support a winch 15.6, which may include an electrical motor and its controller (16).

The cross bar 45 includes a cross-bar eyelet bracket 45.1, onto which a winch cable 15.9 may be attached (at position 47 in FIGS. 8 and 22A), allowing the winch 15.6 to lift the cross bar 45, and consequently the container. The gooseneck 20 may have two sections (20.1, 20.2), one of which slides into the other. A bolt 20.3 may be tightened to securely fix the two sections together. This allows the gooseneck 20 to be lengthened or shortened to accommodate different heights.

Figure 9A:
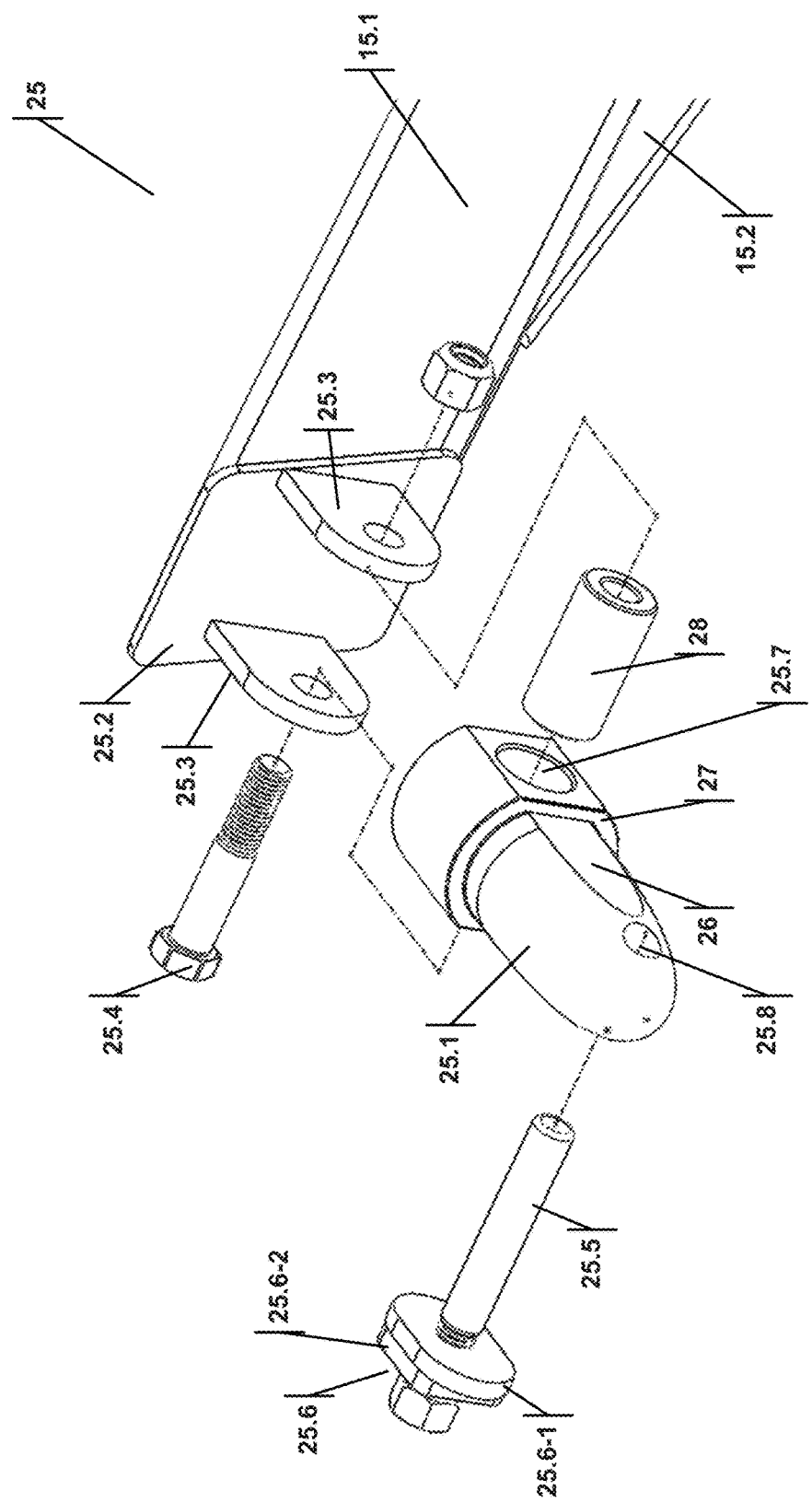
FIG. 9A is an exploded isometric view of the top block connection assembly.
Figure 11:
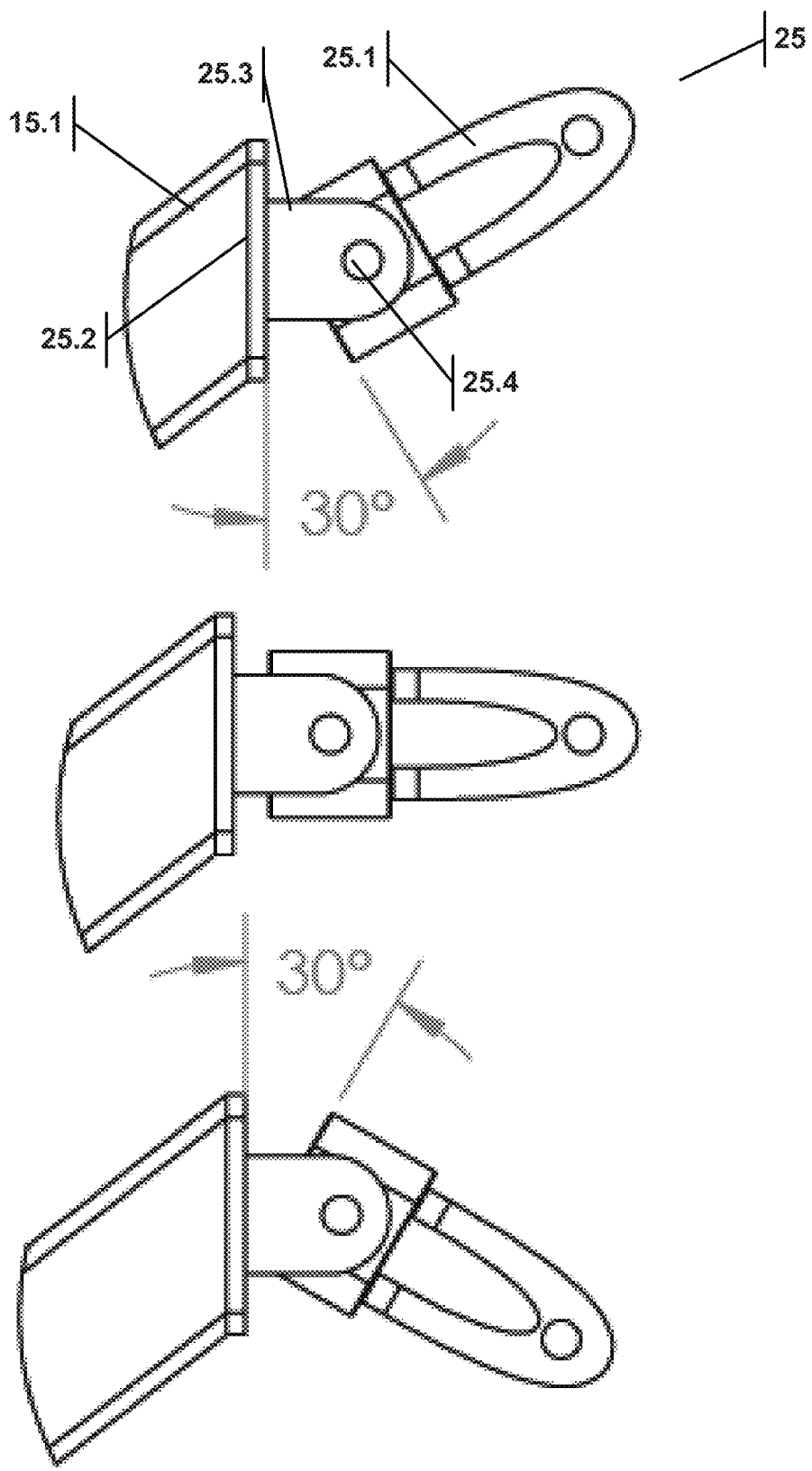
FIG. 11 is a side view of the top block connection assembly, illustrating the rotation of the upper plug.

FIGS. 9A though 10 detail the top block connection assembly 25. Located at the end of each top v-Lift Frame bar 15.1, it includes plug pivot plates 25.3 extending from a frame end plate 25.2. The plug pivot plates 25.3 support a pivot bolt 25.4 that can be inserted through the upper plug 25.1, which may have bearings 28. A plug mounting bolt 25.5 extends from the upper plug 25.1. A mounting bolt flange 25.6 connects to the plug mounting bolt 25.5 and secures the top block connection assembly 25 to the top container mounting block 8. The upper plug 25.1 may pivot about the plug pivot bolt 25.4, as shown in FIG. 11. The rotational freedom assists when installing the V-Lift frame to the container, and relieves stress between the container 5 and the V-Lift frame 15 during transit. The upper plug 25.1 may be an oblong dome shape with flat sides 26 that assist in the alignment and insertion into the top mounting block holes. The upper plug 25.1 may also have an expanded rim 27 (FIG. 12) with a diameter that is larger than the top mounting block hole, such that the expanded rim 27 prevents the upper plug 25.1 from further insertion into the top mounting block hole.

Figure 12:
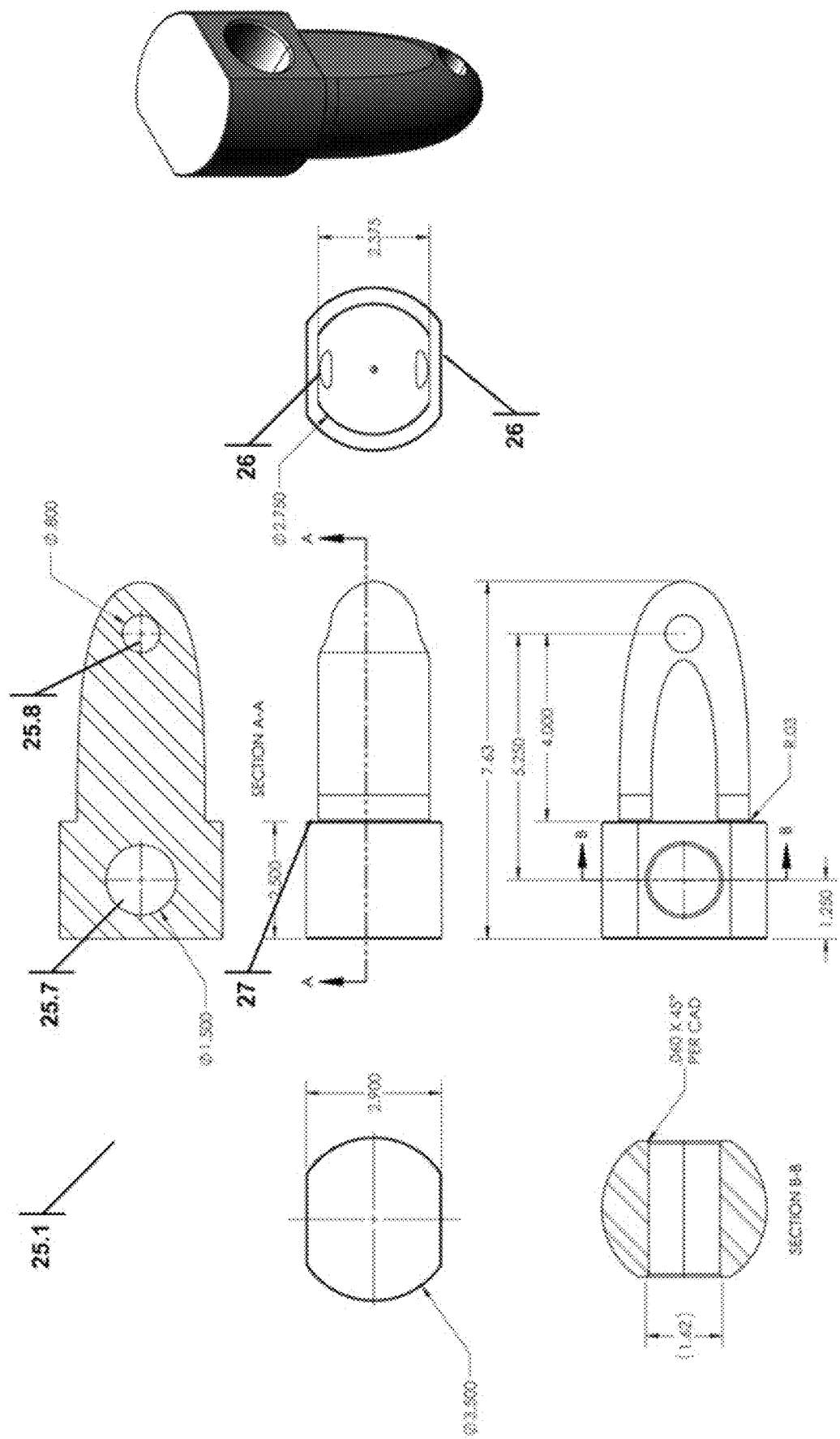
FIG. 12 is a detailed schematic with dimensions of the upper plug.
Figure 13:
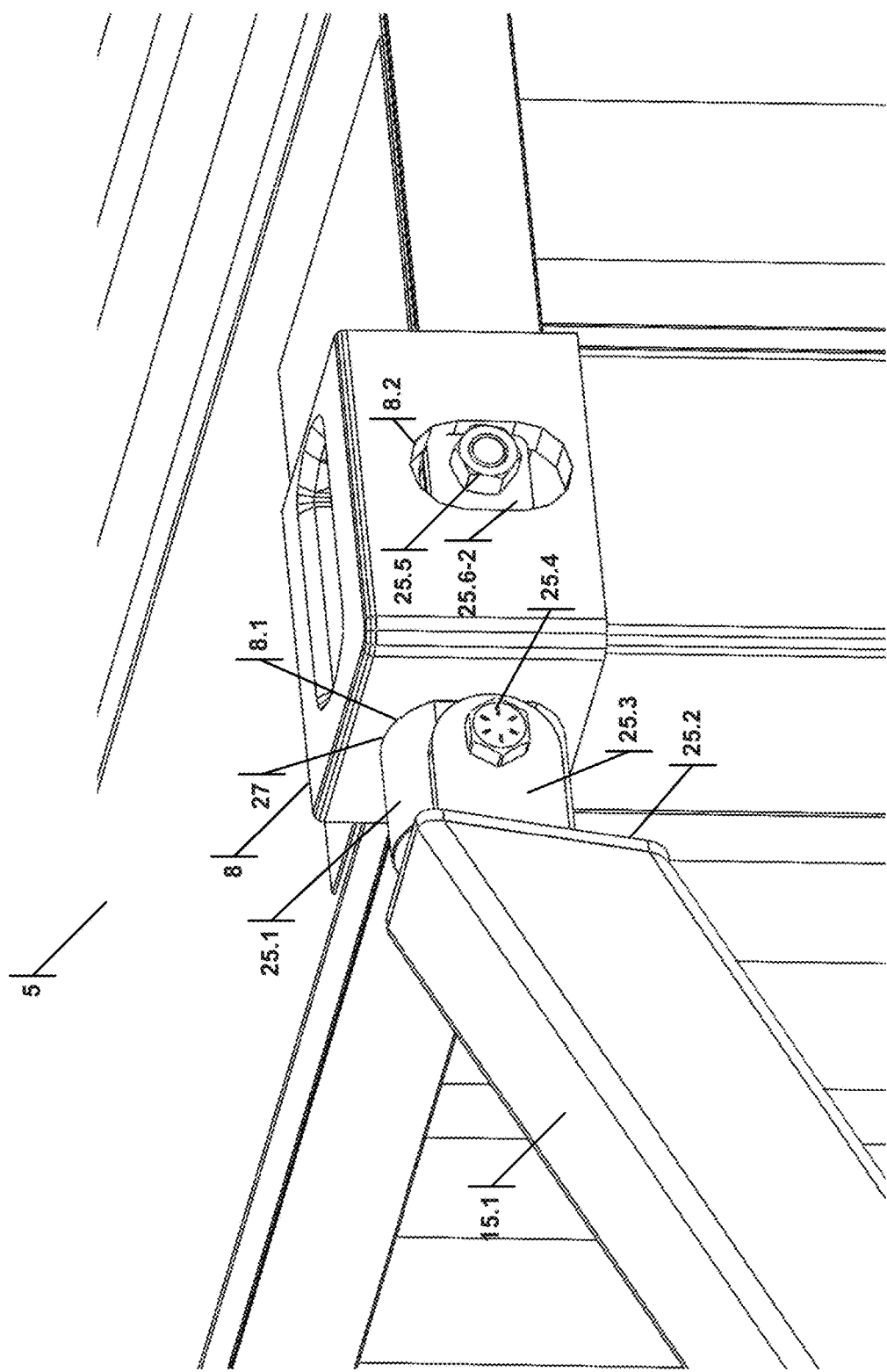
FIG. 13 is a side isometric view of the top block connection assembly connected to the top container mounting block of a container.
Figure 14:
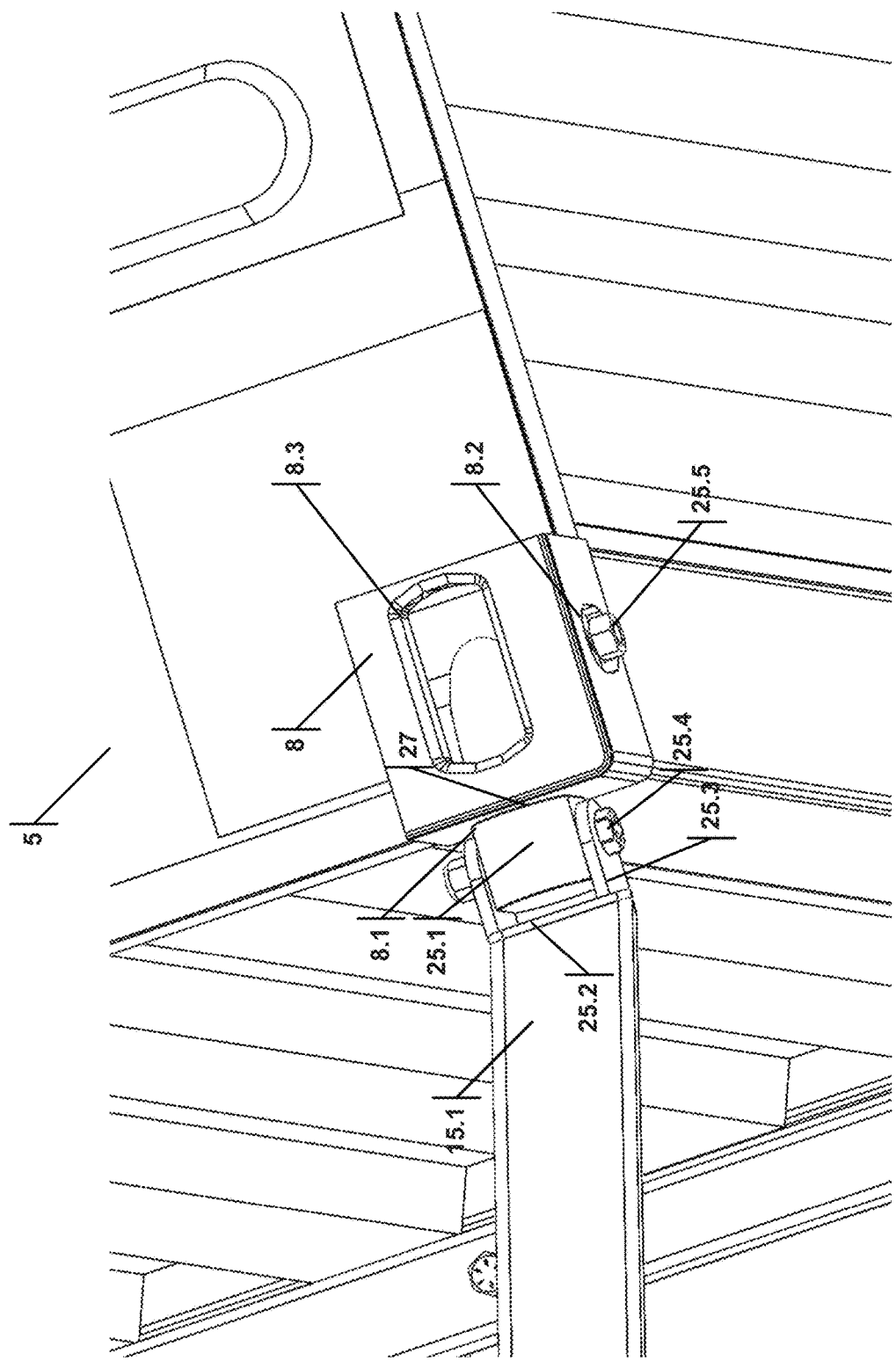
FIG. 14 is a top isometric view of the top block connection assembly of FIG. 13.
Figure 15:
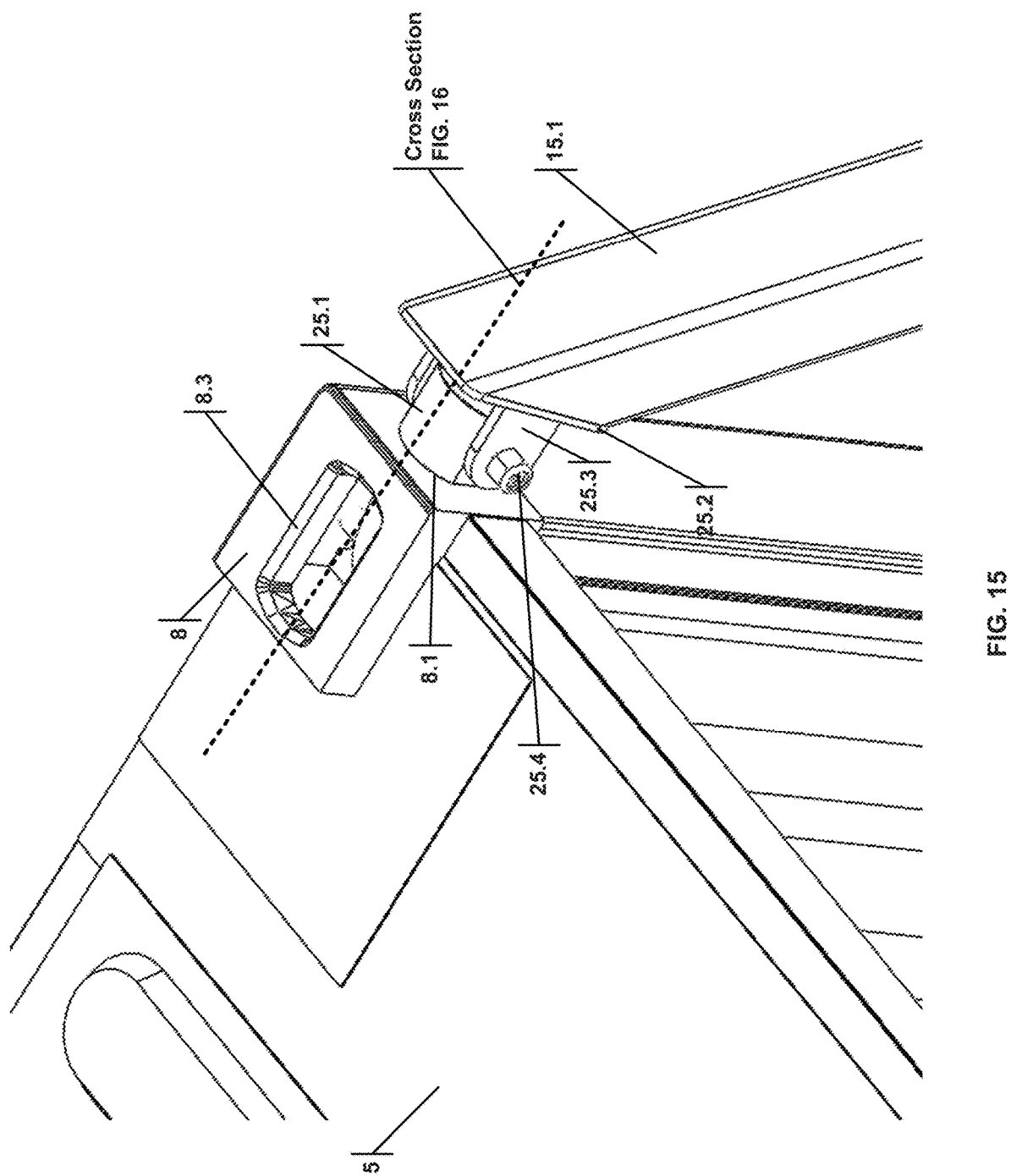
FIG. 15 is a top isometric view of the top block connection assembly of FIG. 13.
Figure 16:
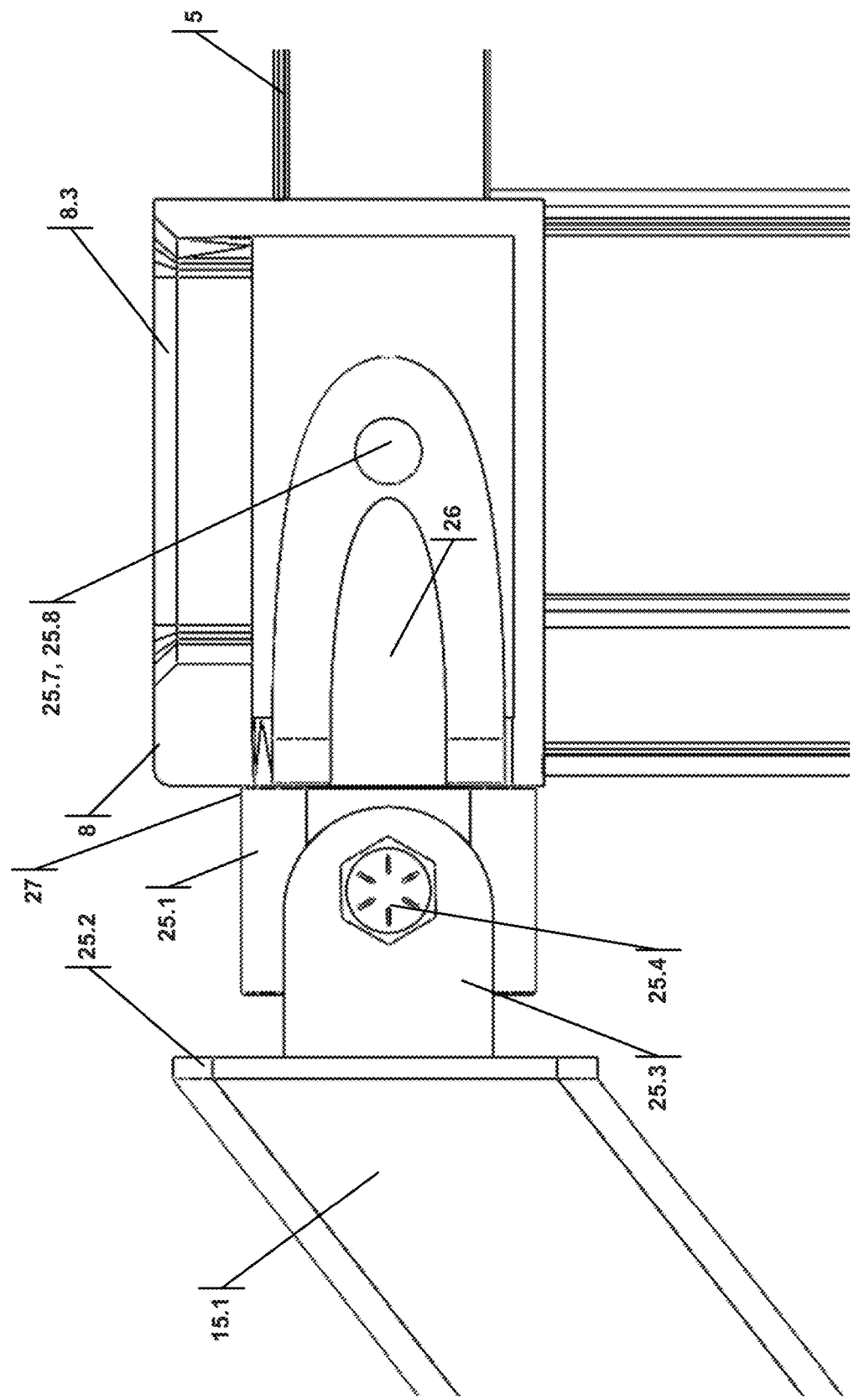
FIG. 16 is a side cross-sectional view of the top block connection assembly of FIG. 13.

The upper plug 25.1 is shown in detail with preferred dimensions in FIG. 12. Holes 25.7 and 25.8 receive the plug pivot bolt 25.4 and the plug mounting bolt 25.5, respectively.

Figure 10:
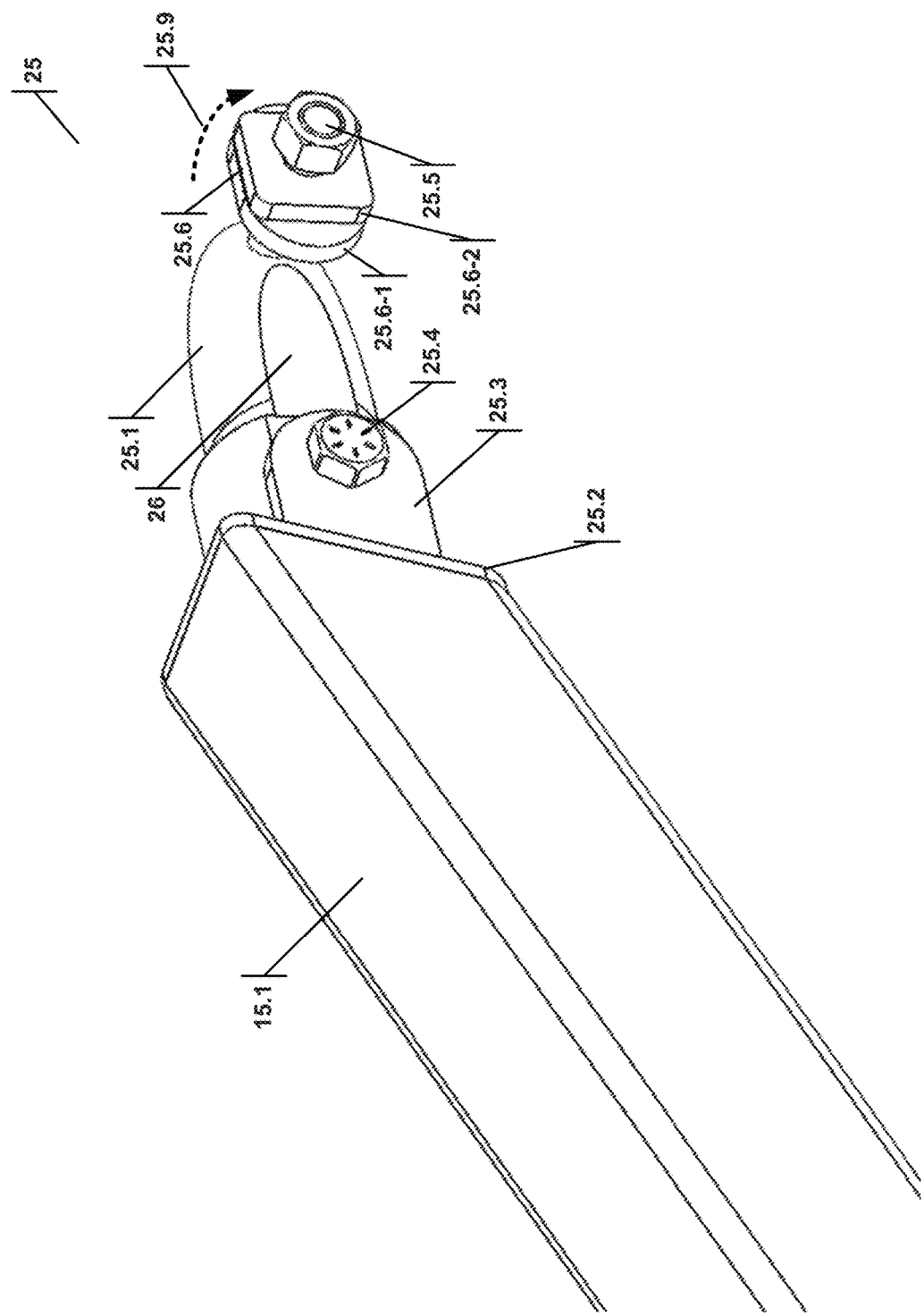
FIG. 10 is an isometric view of the top block connection assembly.

FIGS. 13 through 16 illustrate the top block connection assembly 25 connected to the top container mounting block 8 of a container 5. The upper plug 25.1 is inserted into the top mounting block hole 8.1; then, the plug mounting bolt 25.5 is inserted through the top mounting block hole 8.2 and affixed to the upper plug 25.1. Importantly, the plug mounting bolt flange 25.6 must be aligned with the mounting hole 8.2 so that the plug mounting bolt 25.5 can be fully inserted and connected to the upper plug 25.1. Once it is inserted, the flange 25.6 may be rotated (see arrow 25.9, FIG. 10) by turning the plug mounting bolt 25.4, thus forcing the mounting bolt 25.4 against the back wall of the top container mounting block 8, and also rotating the oblong portion of the flange 25.6-1 to prevent the bolt 25.5 from escaping through the hole 8.2, and seating the square portion of the flange 25.6-2 within the hole 8.2, preventing the rotation of the flange 25.6 (see FIG. 13). Because the plug mounting bolt 25.4 is threaded, once the square portion of the flange 25.6-2 seats within the hole 8.2, turning the bolt causes the flange 25.6 to laterally travel along the plug mounting bolt 25.4, pressing the oblong portion of the flange 25.6-1 against the interior wall of the mounting block, and providing a secure connection of the top block connection assembly 25 to the container 5.

Figure 17A:
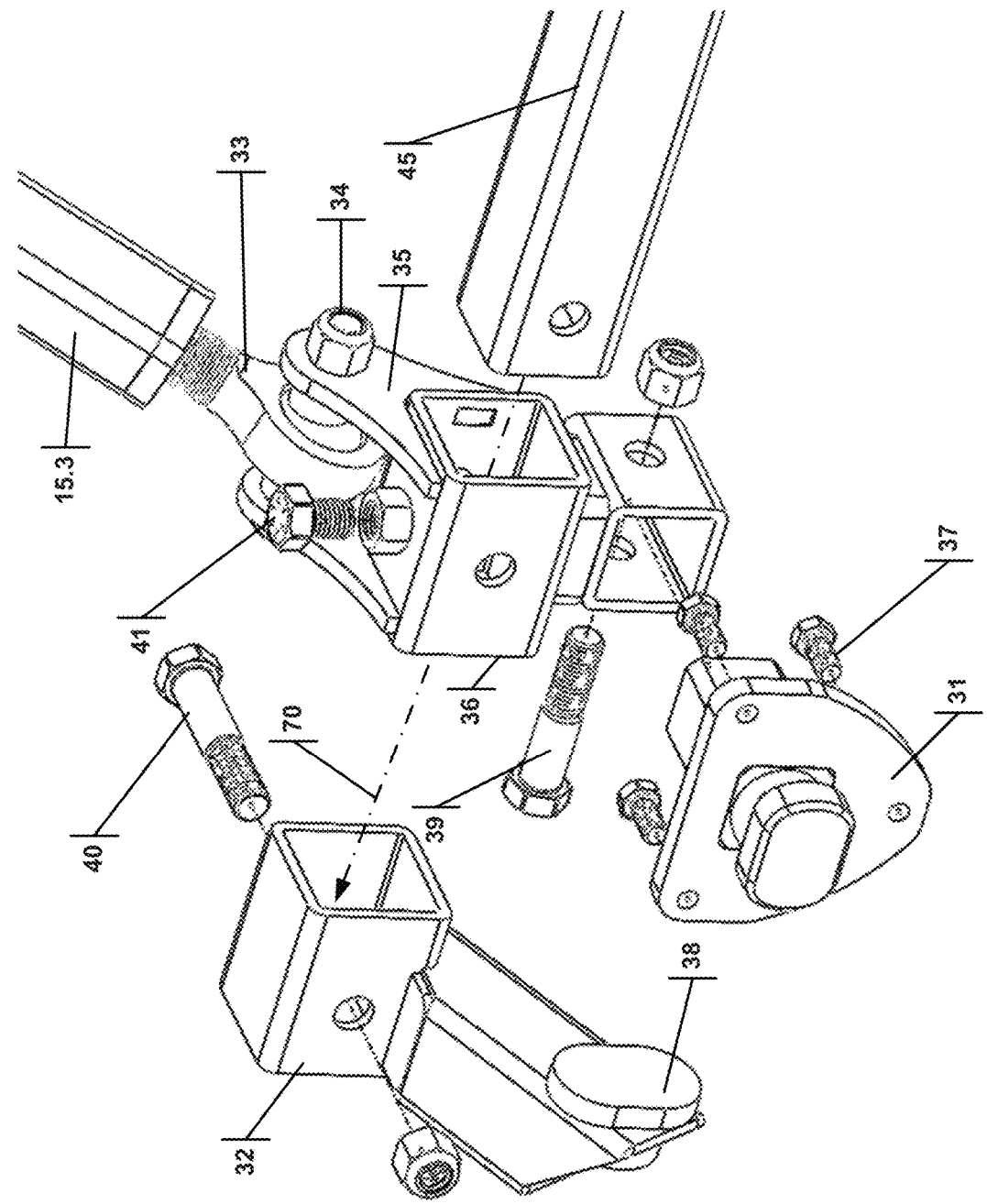
FIG. 17A is an exploded isometric view of the bottom block connection assembly.
Figure 17B:
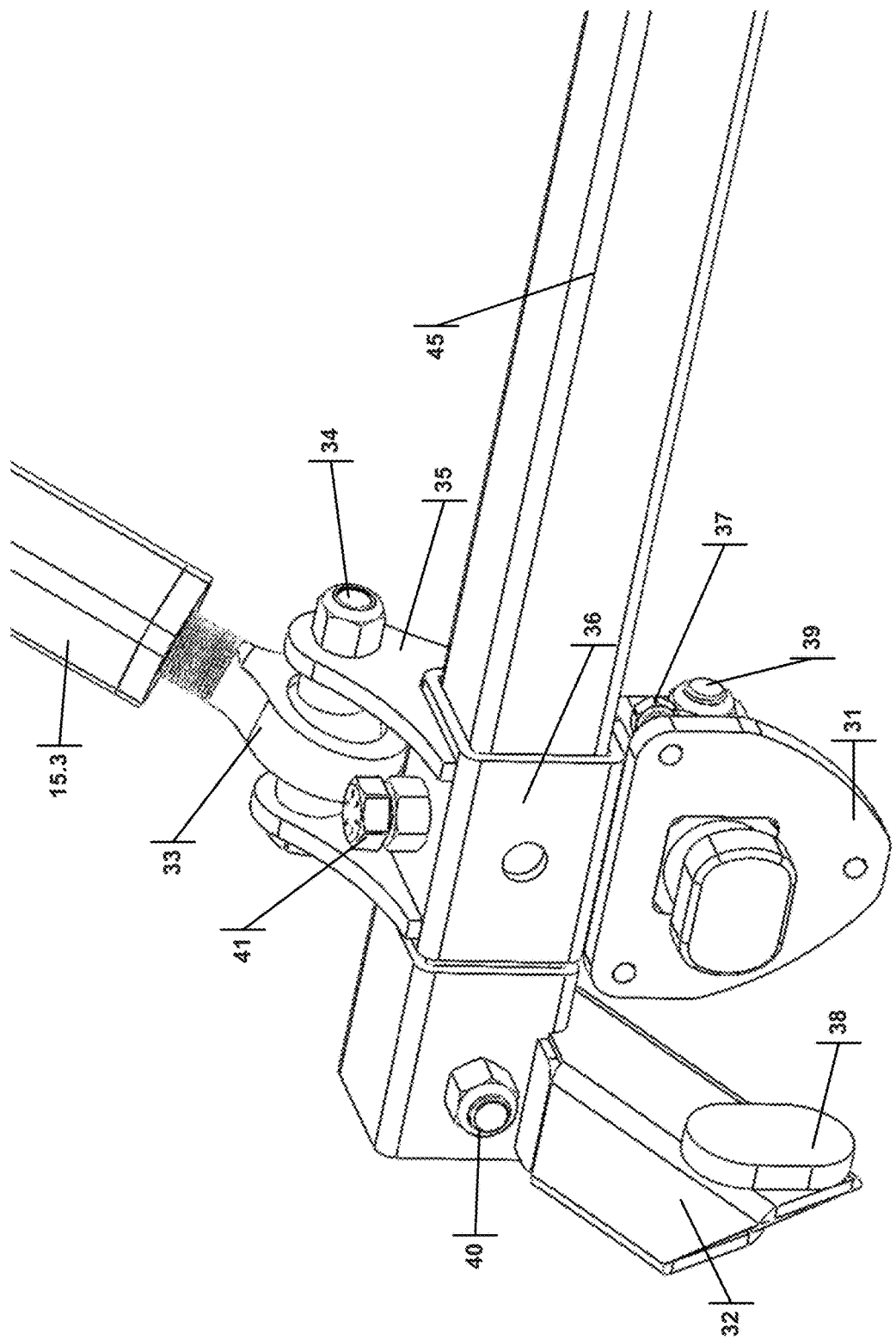
FIG. 17B is an isometric view of the bottom block connection assembly.
Figure 18:
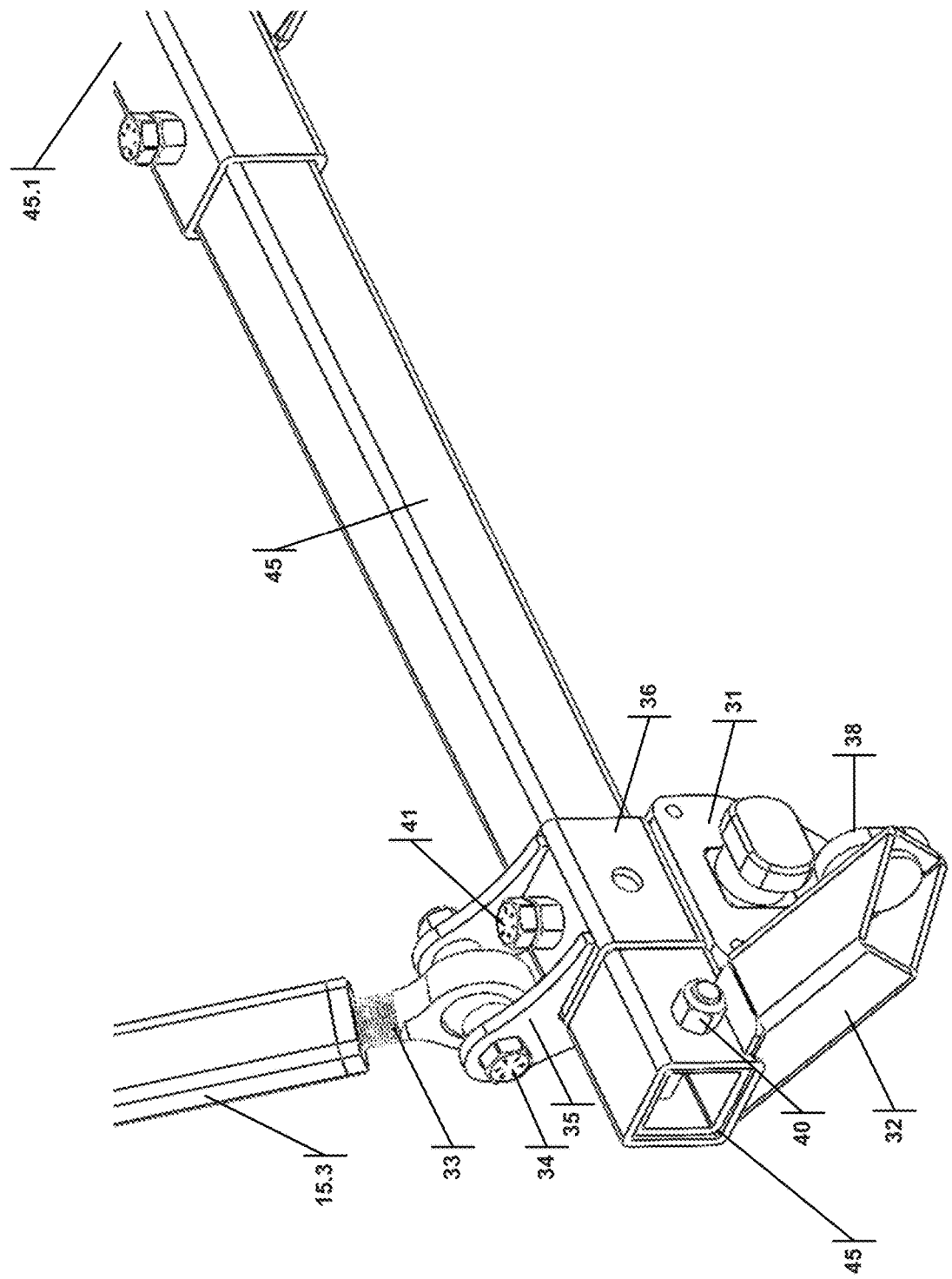
FIG. 18 is an isometric view of the bottom block connection assembly.
Figure 19:
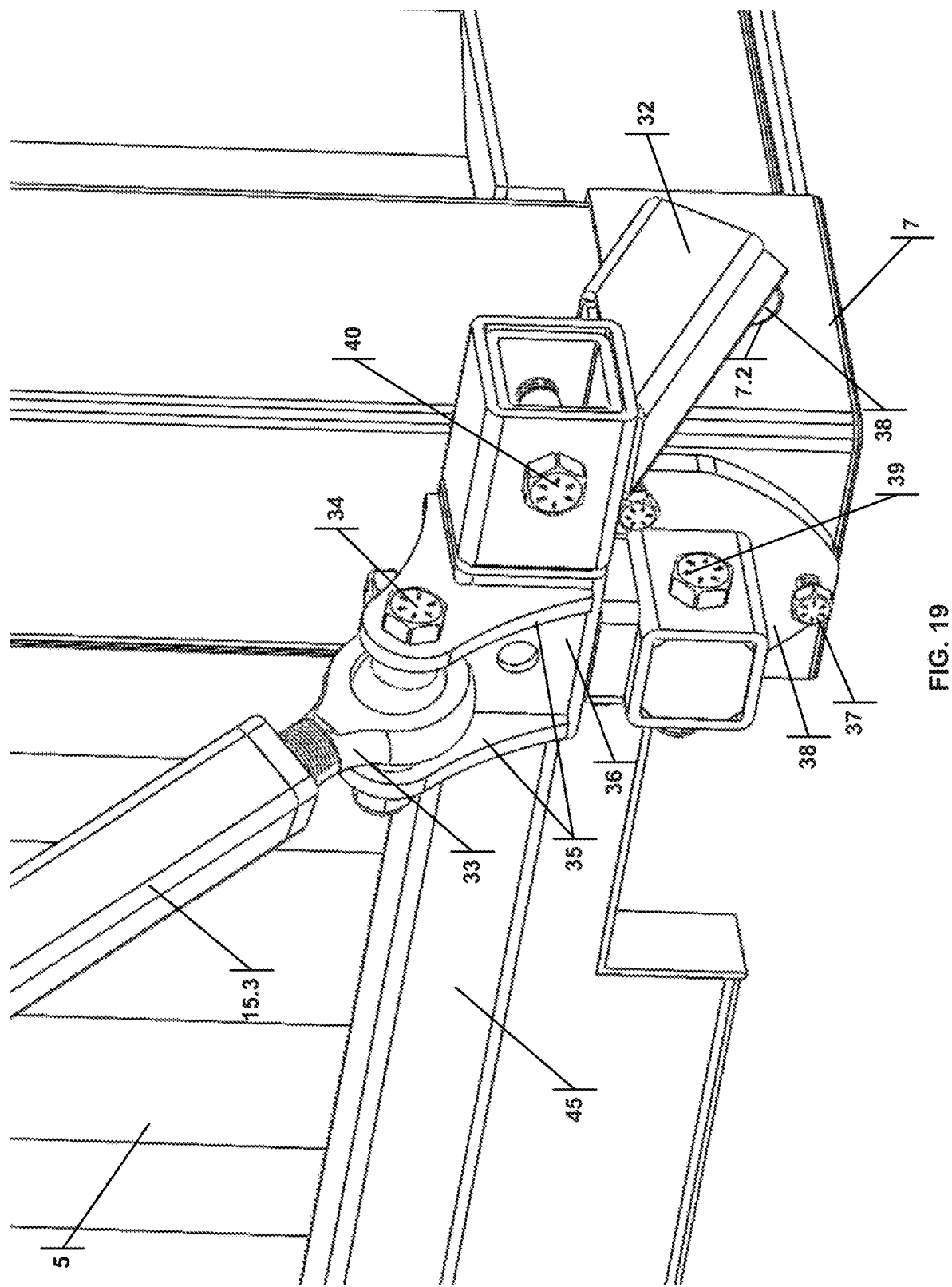
FIG. 19 is a side isometric view of the bottom block connection assembly connected to the bottom container mounting block of a container.
Figure 20:
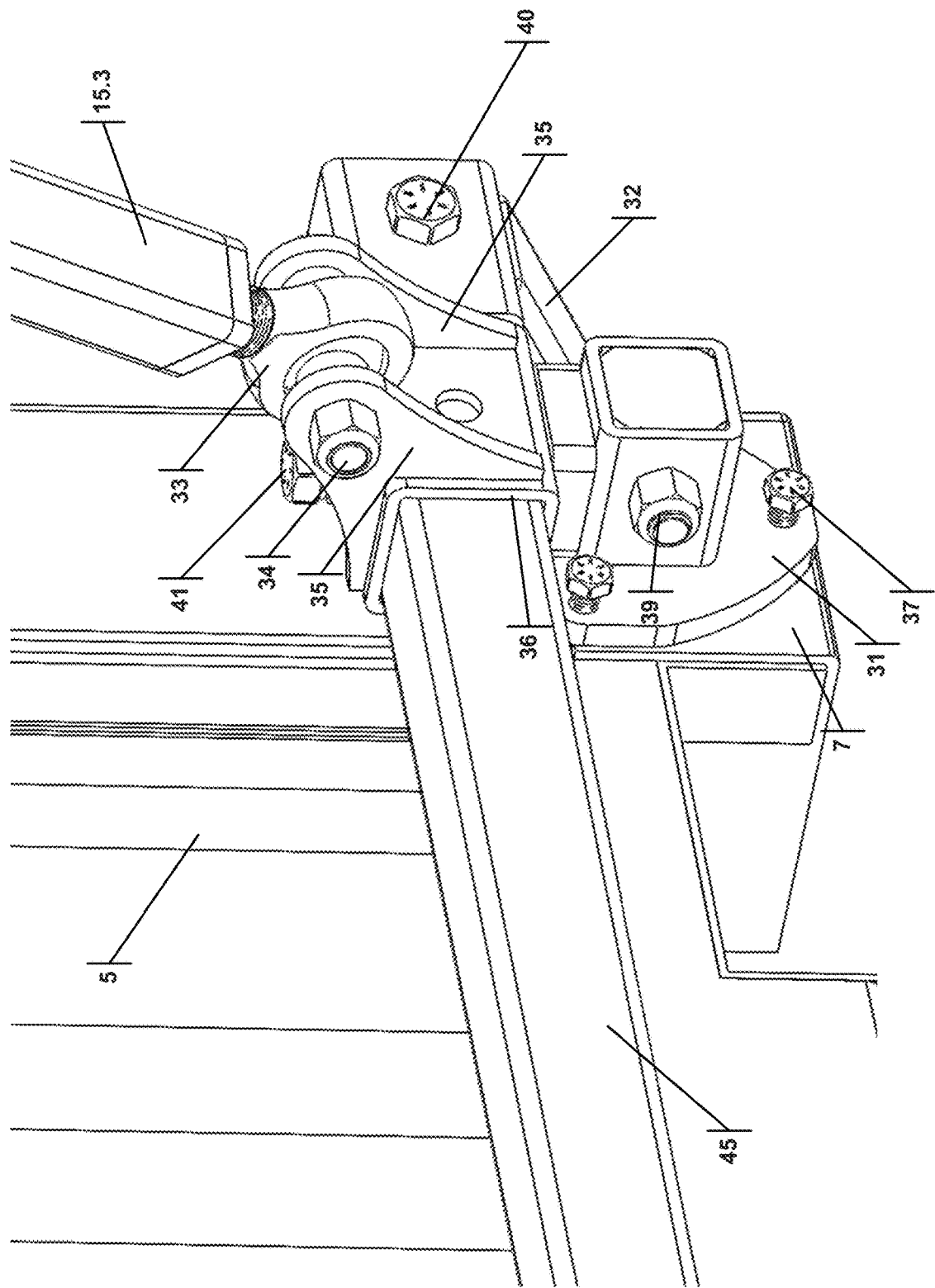
FIG. 20 is a side isometric view of the bottom block connection assembly connected to the bottom container mounting block of a container.
Figure 21:
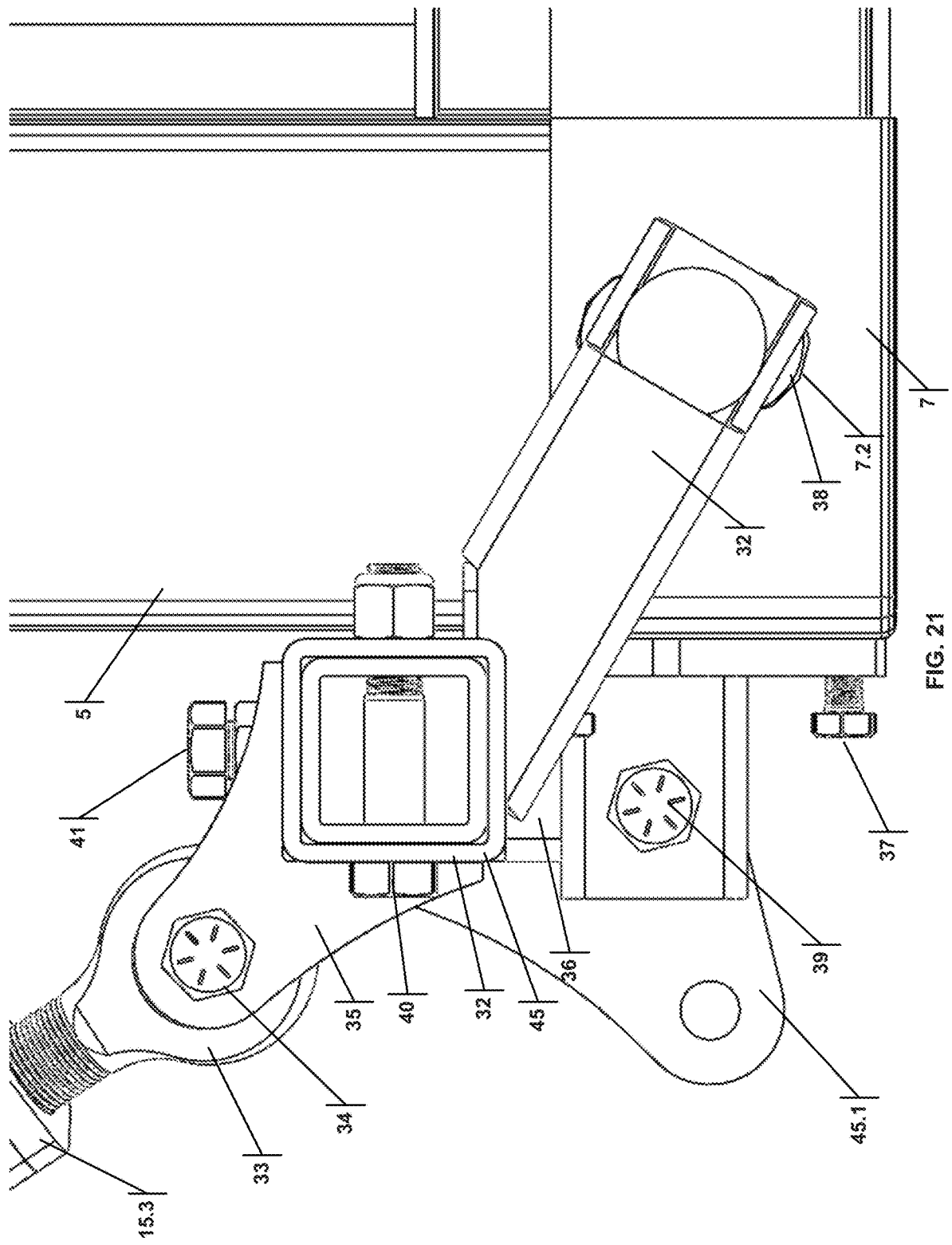
FIG. 21 is a side view of the bottom block connection assembly connected to the bottom container mounting block of a container.
Figure 24A:
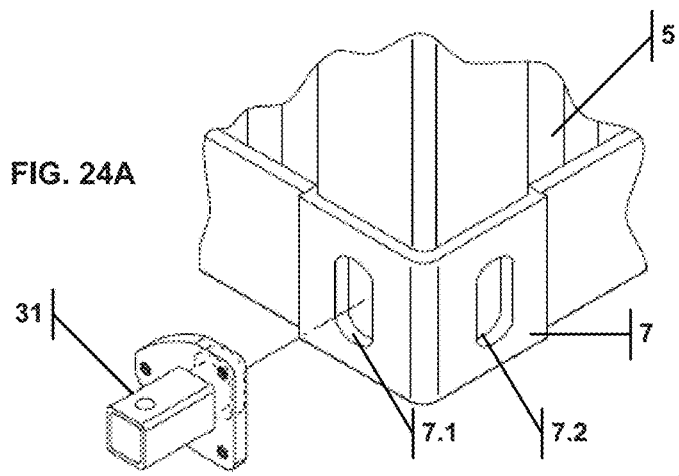
FIG. 24A illustrates the initial alignment of the cam lug relative to the bottom container mounting block of a container.
Figure 24B:
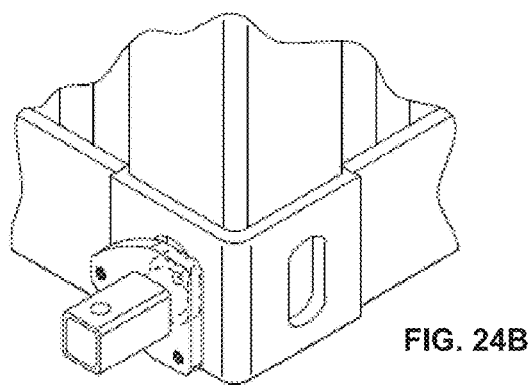
FIG. 24B illustrates the insertion of the cam lug into the bottom container mounting block of a container.
Figure 24C:
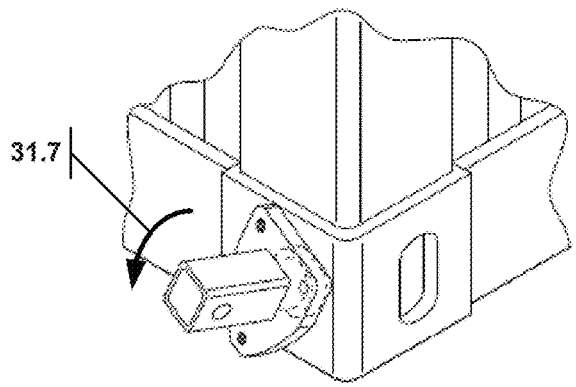
FIG. 24C illustrates the rotation of the cam lug while it is inserted into the bottom container mounting block of a container.
Figure 24D:
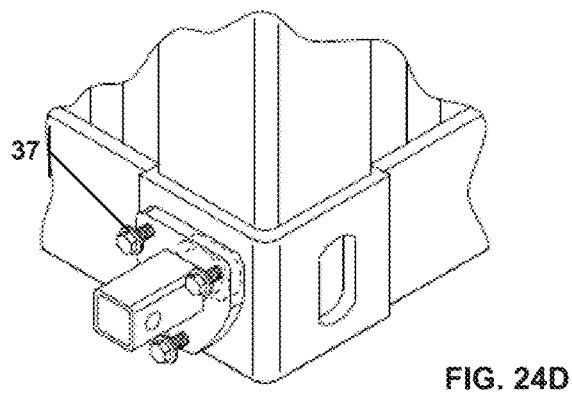
FIG. 24D illustrates attaching the set bolts to fix the cam lug more securely to the bottom container mounting block of a container.

FIGS. 17A through 18 detail the bottom block connection assembly 30. Located at the end of each strut 15.1, the bottom block connection assembly 30 includes a Heim joint 33, rotationally connected via support bolt 34 to the Heim supports 35 extending from the cross-bar connector 36. The cross bar 45 extends through the cross-bar connector 36 and is secured thereto by the bolt 41. The cross bar 45 also extends through the orthogonal connection bar 32 and is affixed to the cross bar 45 by bolt 40. A lug 38 extends from the orthogonal connection bar 32 and is constructed to be inserted into the bottom mounting block hole 7.2. The cross-bar connector 36 also connects to a cam lug 31 and is affixed thereto by bolt 39. Set bolts 37 secure the cam lug 31 to the bottom container mounting block 7. The cam lug 31 attaches to a first face of the bottom container mounting block 7, while the lug 38 of the orthogonal connection bar 32 attaches to a second face of the container mounting block 7 that is orthogonal to the first face. FIG. 24A illustrates the bottom mounting block hole 7.1 into which the cam lug 31 connects, as well as the bottom mounting block hole 7.2 into which the lug 38 of the orthogonal connection bar 32 attaches.

FIGS. 22A and 22B detail the cross bar 45 and the cross-bar eyelet bracket 45.1. Bolts 46 may be removed to allow the cross bar 45 (which may have two sections, 45A and 45B, as shown) to slide into the cross-bar eyelet bracket 45.1, which is shown by the arrows 48 indicating the directions of the sliding movement of the cross-bar sections 45A, 45B into the cross-bar eyelet bracket 45.1. This freedom of movement allows for an easy installation of the bottom block connection assembly 30 to the container 5.

Figure 23A:
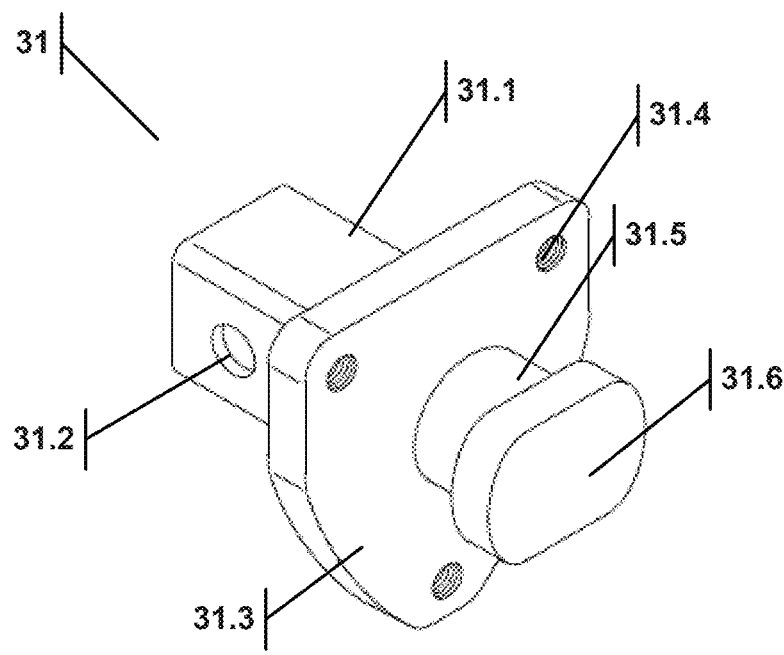
FIG. 23A is a front isometric view of the cam lug.
Figure 23B:
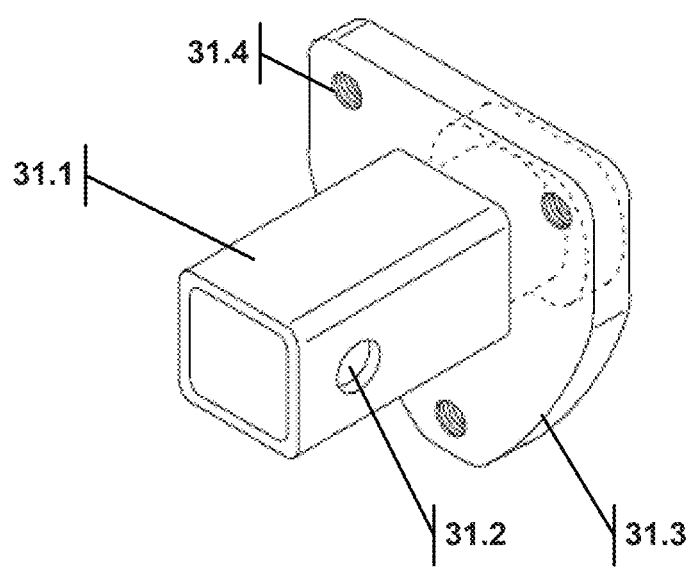
FIG. 23B is a rear isometric view of the cam lug.

FIGS. 23A and 23B show the cam lug 31 in greater detail. The cam lug 31 comprises a cam flange 31.3 with set bolt threading 31.4, connected to a necked lug 31.5 with an oblong tip 31.6. The cam flange 31.3 is triangularly shaped with rounded corners. A connection post 31.1 with a post hole 31.2 allows the cam lug 31 to be fixably mounted to the container mounting blocks, as shown in FIGS. 24A-24D. The mounting hole 7.1 is oblong. First, the necked lug 31.5 of the cam lug 31 is inserted into the mounting hole 7.1 (FIGS. 24A-24B); then, the cam lug 31 is turned 90-degrees (arrow 31.7, FIG. 24C), which locks the mounting hole 7.1 to the cam lug 31. However, in the absence of the cam flange 31.3, the necked lug 31.5 will slide vertically within the mounting hole 7.1. The cam flange 31.3 is shaped to allow the insertion of the necked lug 31.5 into the mounting hole 7.1. When the cam lug 31 is rotated, the cam flange 31.3 pushes against the ground, lifting the necked lug 31.5 up against the inner top surface of the bottom container mounting block 7. Thus, there is substantially no vertical play. Also, when the necked lug 31.5 is rotated 90 degrees after insertion, the long side of the oblong tip 31.6 is up against the inner top surface of the bottom container mounting block 7. Having a greater surface area of contact with little to no vertical play yields a much stronger and stabler connection. Finally, once the cam lug 31 is in the proper position, the set bolts 37 can be threaded through the set bolt threading 31.4, mounting the cam lug 31 to the bottom container mounting block 7.

Figure 25A:
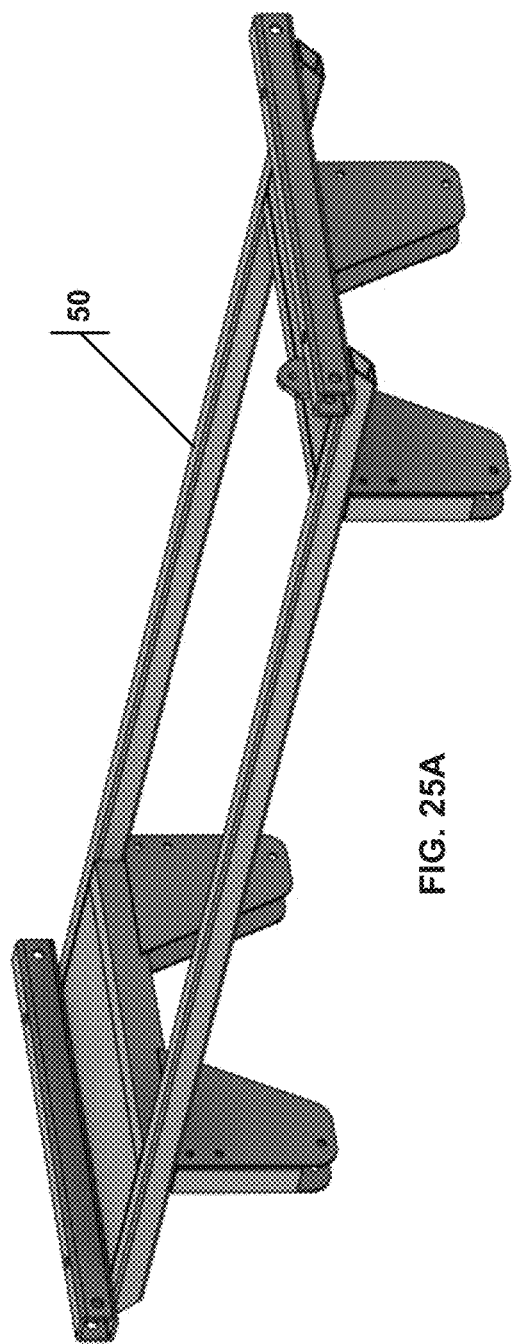
FIG. 25A is an isometric view of the container saddle.
Figure 25B:
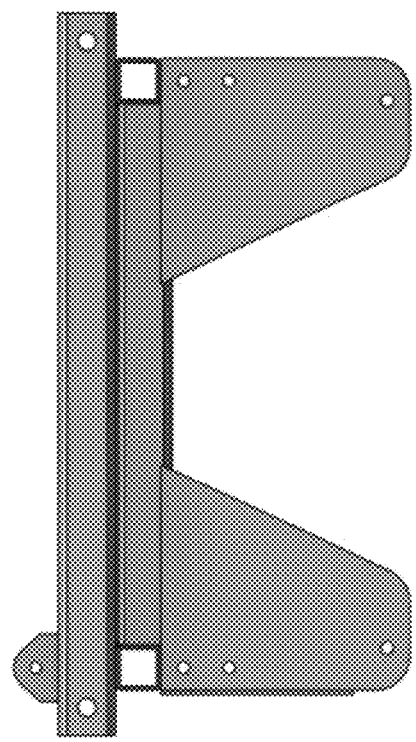
FIG. 25B is a side view of the container saddle.

FIGS. 25A and 25B detail the container saddle 50, upon which the container 5 may be mounted. As shown in FIGS. 25C and 25D, the saddle 50 may support a leaf spring 60 and axle 65, upon which wheels 50 may be mounted.

Installation of the V-Lift Frame 15 will now be described. The following installation steps are not presented in any particular order and are not intended to be limited as such.

The two bottom block assemblies 30 and the cross bar 45 are attached to the container 5 as follows: (A) into each bottom corner of the container 5, the cam lugs 31 are installed into the bottom container mounting block 7, as shown in FIGS. 24A-24D and described above; (B) the cross-bar connectors 36 slide over the connection posts 31.1 of the cam lugs 31 and are secured by bolts 39 inserted through the post holes 31.2; (C) each cross-bar connector 36 receives one section 45A of the cross bar 45 (see arrow 70, FIG. 17A); (D) the cross-bar eyelet bracket 45.1 receive both cross-bar sections 45A, 45B (see arrows 48, FIG. 22B); (E) the lug 38 for each orthogonal connection bar 32 receives one section 45A of the cross bar 45 (see arrow 70, FIG. 17A) and is inserted into the bottom container mounting block 7 (in the mounting hole with a face that is orthogonal to the face of the mounting hole that supports the cam lug 31); and (F) bolts 40 and 46 are tightened to secure the bottom block assemblies 30 and the cross bar 45 to the container 5.

The gooseneck 20 is mounted to the pickup bed ball joint, and the upper plugs 25.1 are aligned and inserted into the top container mounting block 8. Alignment is facilitated by the rotational freedom of the upper plug 25.1 relative to the V-Lift Frame 15 (see FIG. 11). Once inserted, the plug mounting bolt 25.5 is inserted through the top mounting block 8.1 with the flange 25.6 in the proper rotational position to allow insertion, and the plug mounting bolt 25.5 is secured to the upper plug 25.1. While securing, the oblong portion of the flange 25.6-1 is rotated within the top container mounting block 8 such that the plug mounting bolt 25.5 cannot exit, and the square portion of the flange 25.6-2 seats within the hole 8.2, preventing the rotation of the flange 25.6 (see FIG. 13).

The winch cable 15.9 is connected to the cross-bar eyelet bracket 45.1, and the winch 15.6 is actuated to lift the bottom of the container 5. Once it is lifted sufficiently, the Heim joints 33 are aligned between the Heim supports 35, and the Heim support bolts 34 are inserted and secured. At this point, the container 5 may be transported.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently-preferred embodiment of the invention and are therefore representative of the subject matter that is broadly contemplated by the present invention. It is further understood that the scope of the present invention fully encompasses other embodiments that may become obvious to those skilled in the art, and that the scope of the present invention is accordingly limited by nothing other than the appended claims.

The invention claimed is:

1. A transport frame (15) for use with a container (5) with top mounting blocks (8) and bottom mounting blocks (7), and a vehicle (10) with a tow ball (12), the frame (15) comprising:
    a gooseneck (20) constructed to pivotally mount to the tow ball (12);
    a first and a second top frame bars (15.1) connected at a first position of the gooseneck (20) and extending away from the gooseneck (20) in a V shape;
    a first and a second bottom frame bars (15.2) connected at a second position of the gooseneck (20) and extending away from the gooseneck (20) in a V shape, wherein the first bottom frame bar (15.2) connects to the first top frame bar (15.1), and the second bottom frame bar (15.2) connects to the second top frame bar (15.1);
    a first top block connection assembly (25) connected to the end of the first top frame bar (15.1) opposite the gooseneck (20);
    a second top block connection assembly (25) connected to the end of the second top frame bar (15.1) opposite the gooseneck (20);
    wherein the first and second top block connection assemblies (25) are constructed to attach to the top mounting blocks (8);
    a first strut (15.3) connected to and extending downwardly away from the first top frame bar (15.1);
    a second strut (15.3) connected to and extending downwardly away from the second top frame bar (15.1);
    a first bottom block connection assembly (30) connected to the end of the first strut (15.3) opposite the connection to the first top frame bar (15.1);
    a second bottom block connection assembly (30) connected to the end of the second strut (15.3) opposite the connection to the second top frame bar (15.1);
    wherein the first and second bottom block connection assemblies (30) are constructed to attach to the bottom mounting blocks (7);
    a cross bar (45) connected to the first bottom block assembly (30) and to the second bottom block assembly (30); and
    a winch (15.6) positioned in between the first and second top frame bars (15.1), the winch (15.6) comprising a cable (15.9) connected to the cross bar (45).

2. The transport frame of claim 1, wherein the cross bar (45) comprises:
    a first section (45A) and a second section (45B) that slide into a cross-bar bracket (45.1), the cross-bar bracket (45.1) comprising at least two bolts (46) that secure the first section (45A) and the second section (45B) to the cross-bar bracket (45.1).

3. The transport frame of claim 2, wherein the cross-bar bracket (45.1) comprises an eyelet constructed to attach to the cable (15.9).

4. The transport frame of claim 1, further comprising:
    a cross support (15.8) with two ends, one end connected to the first top frame bar (15.1) and the other end connected to the second top frame bar (15.1);
    wherein the winch (15.6) is mounted on the cross support (15.8).

5. The transport frame of claim 1, wherein:
    the connection of the first strut (15.3) to the first top frame bar (15.1) comprises a first pivot (15.5); and
    the connect of the second strut (15.3) to the second top frame bar (15.1) comprises a second pivot (15.5).

6. The transport frame of claim 1, wherein the gooseneck (20) comprises two sections (20.1, 20.2), one of which slides into the other, and a bolt (20.3) that fixes the position of the sections relative to each other.

7. The transport frame of claim 1, where the first and second top block connection assemblies (25) each comprises:
    an upper plug (25.1) pivotally mounted to the end of the top frame bar (15.1), the upper plug (25.1) constructed to be inserted into the top mounting block (8);
    wherein the upper plug (25.1) further comprises a hole to receive a plug mounting bolt (25.5).

8. The transport frame of claim 7, wherein the plug mounting bolt (25.5) comprises a flange (25.6) with:
    an oblong portion (25.6-1) constructed to be inserted into the top mounting block (8), and then rotated to prevent the plug mounting bolt (25.5) from exiting the top mounting block (8); and
    a square portion (25.6-2) constructed to prevent the rotation of the flange (25.6).

9. The transport frame of claim 7, wherein the upper plug (25.1) is oblong-shaped with at least two flat sides (26).

10. The transport frame of claim 7, wherein the upper plug (25.1) comprises an expanded rim (27).

11. The transport frame of claim 1, wherein the first and second bottom block connection assemblies (30) each comprises:
    a joint (33) connected to the end of the strut (15.3);
    wherein the joint (33) is pivotally connected to a cross-bar connector (36) constructed to receive the cross bar (45).

12. The transport frame of claim 11, wherein the first and second bottom block connection assemblies (30) each further comprises:
- a cam lug (31) constructed to be inserted into the bottom mounting block (7) and secured thereto by rotating the cam lug (31);
- wherein the cam lug (31) is connected to the cross-bar connector (36).

13. The transport frame of claim 12, wherein the bottom mounting blocks (7) each comprises a first hole with a first face (7.1) and a second hole with a second face (7.2), wherein the first face is orthogonal to the second face, and wherein the first and second bottom block connection assemblies (30) each further comprises:
- an orthogonal connection bar (32) connected to the cross bar (45) and comprising a lug (38) constructed to be inserted into the second hole (7.2);
- wherein the cam lug (31) is constructed to be inserted into the first hole (7.1).

14. The transport frame of claim 12, wherein the cam lug (31) comprises:
- a post (31.1) with a post hole (31.2);
- a cam flange (31.3) connected to the post (31.1); and
- a necked lug (31.5) with an oblong tip (31.6) connected to the cam flange (31.3);
- wherein the post hole (31.2) receives a bolt (39) to secure the connection of the cross-bar connector (36) to the cam lug (31).

15. The transport frame of claim 1, wherein the winch (15.6) comprises an electric motor with a controller (16).

16. A transport system for use with a container (5) with top mounting blocks (8) and bottom mounting blocks (7), and a vehicle (10) with a tow ball (12), the system comprising:
- a transport frame (15) according to claim 1; and
- a container saddle (50) constructed to be attached to the container (5), the saddle (50) further comprising an axle (65) and at least two wheels (55).

17. The transport system of claim 16, wherein the saddle (50) further comprises a suspension system (60).

18. A connection structure (31) for use with a container (5) with mounting blocks (7, 8), the connection structure (31) comprising:
- a post (31.1) with a post hole (31.2);
- a cam flange (31.3) connected to the post (31.1), the cam flange (31.3) has a triangular shape with rounded corners;
- a necked lug (31.5) with an oblong tip (31.6) connected to the cam flange (31.3);
- a set bolt (37);
- wherein the necked lug (31.5) is constructed to be inserted into the mounting block (7,8) and, once inserted, the connection structure (31) is rotated by 90 degrees, causing:
  1. The oblong tip (31.6) to prevent the connection structure (31) from detaching from the mounting block (7,8); and
  2. the connection structure (31) to move vertically within the mounting block (7,8) as the cam flange (31.3) contacts the ground.

19. A method of using a connection structure (31), the method comprising:
- providing a connection structure (31) comprising a post (31.1) with a post hole (31.2), a cam flange (31.3) connected to the post (31.1), wherein the cam flange (31.3) is triangularly shaped with rounded corners, and a necked lug (31.5) with an oblong tip (31.6) is connected to the cam flange (31.3) and a set bolt (37);
- inserting the oblong tip (31.6) and necked lug (31.5) into a connection block (7,8) of a container (5);
- rotating the connection structure (31), causing the oblong tip (31.6) to prevent the connection structure (31) from detaching from the mounting block (7,8), and causing the connection structure (31) to move vertically within the mounting block (7,8) as the cam flange (31.3) contacts the ground; and
- tightening the set bolt (37), securing the connection structure (31) to the mounting block (7,8).

20. The method of claim 19, further comprising attaching a connector structure (36) to the connection structure (31).

21. The method of claim 19, further comprising lifting the container (5) via the connection structure (31).

* * * * *